United States Patent
Kawai et al.

(10) Patent No.: US 6,411,348 B2
(45) Date of Patent: *Jun. 25, 2002

(54) ACTIVE MATRIX SUBSTRATE AND PRODUCING METHOD OF THE SAME

(75) Inventors: Katsuhiro Kawai, Kashihara; Shinya Yamakawa, Ikoma; Masaya Okamoto, Soraku-gun; Takayuki Shimada, Yamatokoriyama; Mikio Katayama, Ikoma, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,593

(22) Filed: Jun. 26, 1997

(30) Foreign Application Priority Data

Jul. 2, 1996 (JP) .............................................. 8-172031

(51) Int. Cl.⁷ .............................................. G02F 1/136
(52) U.S. Cl. .............................. 349/40; 349/43; 349/50
(58) Field of Search .............................. 349/50, 40, 43, 349/54, 139; 361/56, 91, 111; 257/356, 59, 72

(56) References Cited

U.S. PATENT DOCUMENTS 5,068,748 A    11/1991  Ukai et al. ..................... 349/40
5,200,876 A  *  4/1993  Takeda et al. ................. 349/40
5,220,443 A  *  6/1993  Noguchi ....................... 349/40
5,233,448 A  *  8/1993  Wu ............................. 349/40
5,521,728 A  *  5/1996  Kodate et al. ................. 349/40
5,691,787 A  * 11/1997  Shimada et al. ............... 349/40

FOREIGN PATENT DOCUMENTS

JP          63-106788        5/1988
JP          3-132723 A       6/1991

* cited by examiner

Primary Examiner—William L. Sikes
Assistant Examiner—Tai V. Duong
(74) Attorney, Agent, or Firm—Nixon & Vanderhye P.C.

(57) ABSTRACT

An active matrix is furnished with an insulating substrate; a plurality of scanning lines and signal lines provided on the insulating substrate in a matrix pattern; pixel electrodes provided in areas enclosed by the scanning lines and signal lines, respectively; switching elements electrically connected to the scanning lines, signal lines, and pixel electrodes, respectively; a resistance control element for electrically connecting two lines selected arbitrary from the scanning lines and signal lines while controlling its own resistance value in response to a voltage applied thereto. According to the above arrangement, it has become possible to increase a margin of the active matrix substrate for the static electricity and improve the production yield without increasing the number of the producing steps.

8 Claims, 16 Drawing Sheets

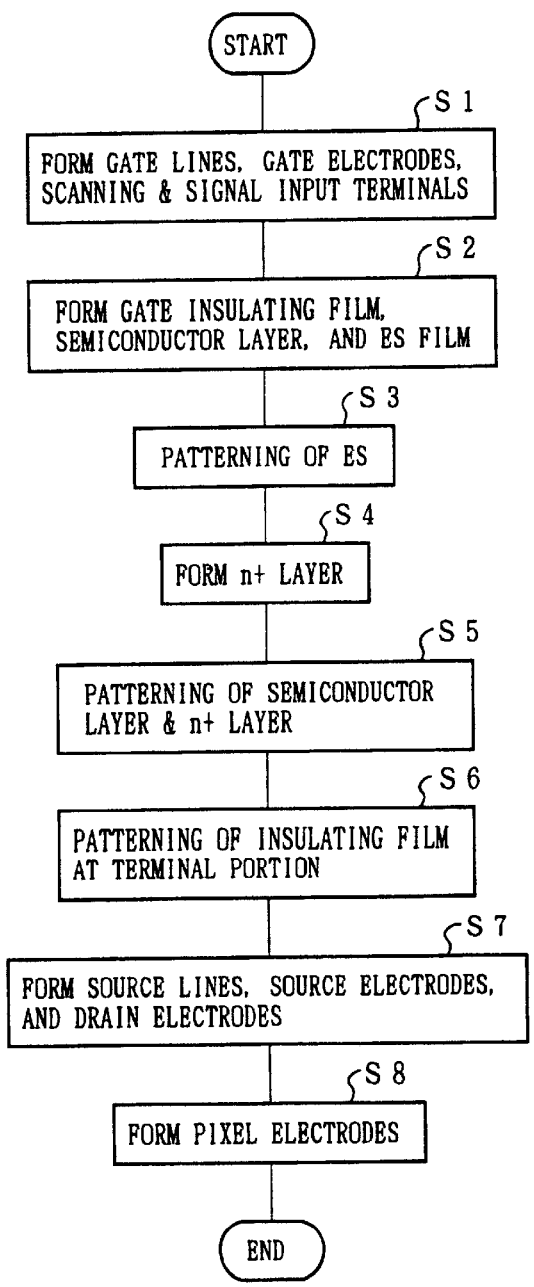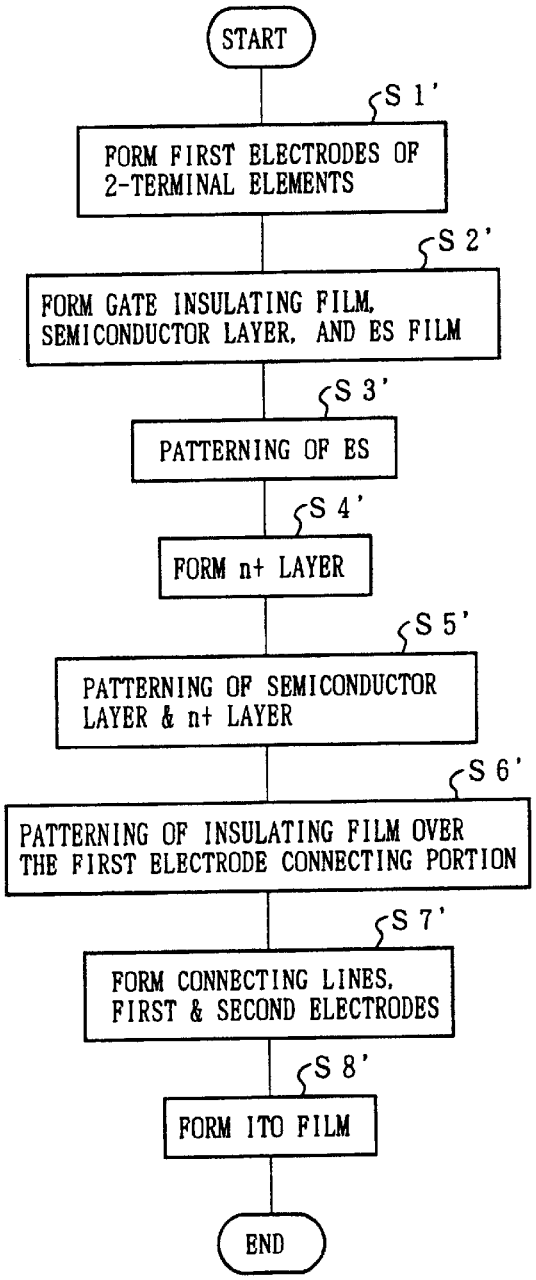

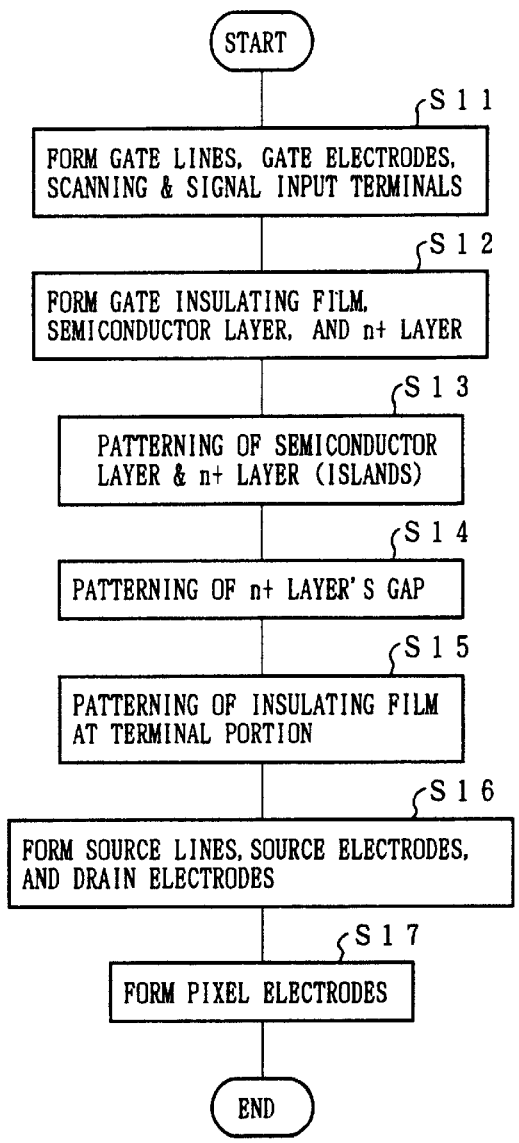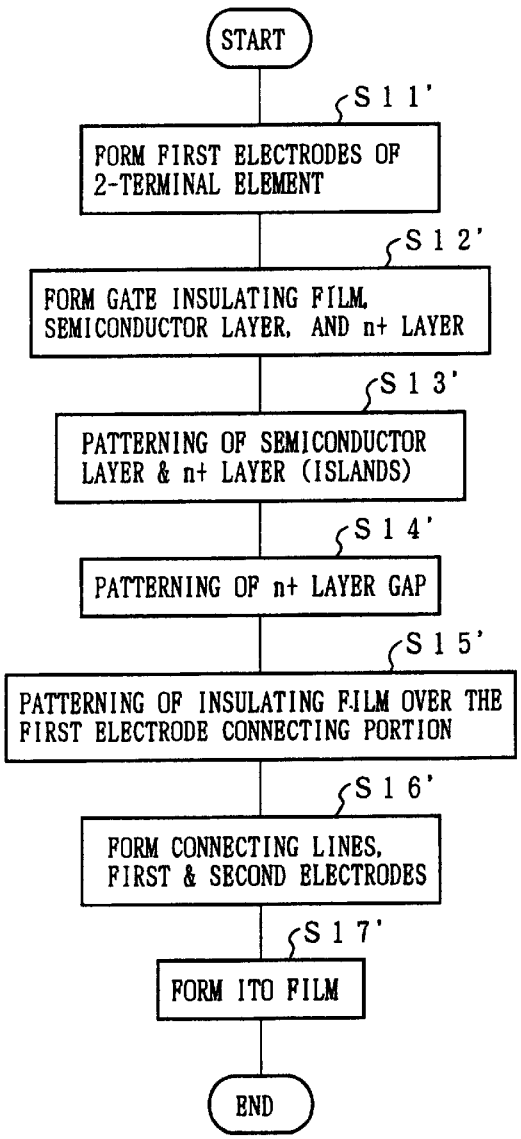

ACTIVE MATRIX SUBSTRATE AND PRODUCING METHOD OF THE SAME

FIELD OF THE INVENTION

The present invention relates to an active matrix substrate having formed thereon a matrix of non-linear elements serving as switching elements, such as thin film transistors, and to a producing method of the same.

BACKGROUND OF THE INVENTION

In a general liquid crystal display element, a display pattern is formed on the screen by selectively driving a matrix of pixel electrodes. In other words, in the above liquid crystal display element, when a voltage is applied across a selected pixel electrode and an opposing electrode, a liquid crystal interposed between these two electrodes as a display medium is optically modulated, and such an optical modulation is recognized as a display pattern.

The active matrix driving method is known as a driving method of the above pixel electrodes. In this method, a matrix of independent pixel electrodes are connected to their respective switching elements, so that each pixel electrode is driven by the ON/OFF action of the switching element. An example of the switching element is a non-linear element, such as a thin film transistor (hereinafter, referred to as TFT), an MIM (metal insulator metal) element, a MOS (metal oxide semiconductor) transistor element, and a diode.

As shown in FIG. 15 as an example, an active matrix substrate using TFTs as the switching elements is arranged in such a manner that a plurality of parallel scanning lines 104 are provided to intersect at right angles with a plurality of parallel signal lines 105.

A pixel electrode 102 is provided to each rectangular area enclosed by the scanning lines 104 and signal lines 105. Also, a TFT 101 functioning as the switching element is provided in the vicinity of each intersection of the scanning lines 104 and signal lines 105.

Each TFT 101 comprises a gate electrode 101$g$ connected to the scanning line 104 electrically, a source electrode 101$s$ connected to the signal line 105 electrically, and a drain electrode 101$d$ connected to the pixel electrode 102 electrically.

The switching element like the TFT 101 is produced by repeating the film forming and etching steps of a conductor layer, a semiconductor layer, and an insulating layer. Thus, a static electricity is often generated during the producing process or transportation process from one apparatus to another, the switching elements formed on the substrate are susceptible to the static-induced damage.

To solve the above problem, various methods have been proposed to protect the switching elements and the like from the static electricity generated during the producing process.

For example, a method disclosed in Japanese Laid-open Patent Application No. 106788/1988 (Tokukaisho No. 63-106788) is illustrated in FIG. 16, in which a conductor short-ring 108 is provided to interconnect all the input terminals electrically. To be more specific, scanning line input terminals 106 connected to the scanning lines 104 in an active matrix portion 103 and signal line input terminals 107 connected to the signal lines 105 in the active matrix portion 103 are interconnected electrically through the conductor short-ring 108. According to this arrangement, a static electricity inputted into any of the scanning line input terminals 106 and signal line input terminals 107 can be dispersed to all the other input terminals 106 and 107 through the conductor short-ring 108.

In other words, when a static electricity is inputted one of the scanning line input terminals 106 and signal line input terminals 107, the input static electricity is dispersed to all the other input terminals 106 and 107 through the conductor short-ring 108 interconnecting these input terminals 106 and 107 electrically. Thus, if a static electricity is inputted into one of the scanning line input terminals 106, the switching elements 101 and pixel electrodes 102 connected to the corresponding scanning line 104 are not affected by the input static electricity.

However, if the input terminals are interconnected through the conductor short-ring 108 as shown in FIG. 16, the conductor short-ring 108 must be removed before a driver is mounted to each input terminal. Therefore, there is no static electricity preventing means in the steps after the driver is mounted, and the switching elements and the like formed on the substrate may be damaged by the static electricity.

To solve the above problem, the above reference discloses an other method of preventing the switching elements and the like from the static electricity generated during the producing process, which is illustrated in FIG. 17. More specifically, the scanning lines 104 and signal lines 105 between the active matrix portion 103 and the scanning line input terminals 106/signal line input terminals 107 are interconnected electrically through a semiconductor short-ring 109 of high resistance made of a semiconductor having a high resistance. According to this arrangement, a static electricity inputted into any of the scanning line input terminals 106 and signal line input terminals 107 can be dispersed to all the other input terminals 106 and 107.

In other words, when a static electricity is inputted into any of the scanning line input terminals 106 and signal line input terminals 107, the input static electricity is dispersed to all the other input terminals 106 and 107 by means of the semiconductor short-ring 109 of high resistance through the scanning lines 104 and signal lines 105.

When all the lines are interconnected through the semiconductor short-ring 109 of high resistance in the above manner, it is not necessary to remove the semiconductor short-ring 109 of high resistance before the driver is mounted to each input terminal. Consequently, the static-induced damage to the switching elements is prevented in the steps not only before but also after the driver is mounted.

However, when the active matrix substrate uses the above semiconductor short-ring 109 of high resistance, it becomes quite difficult to stabilize a resistance value of the semiconductor layer during the producing process, and a problem occurs if the resistance value of the semiconductor short-ring 109 of high resistance is not set to an adequate value. That is, when the resistance value of the semiconductor short-ring 109 of high resistance is too small, there occurs a serious defect, namely, leakage between the input terminals. On the other hand, when the resistance value of the semiconductor short-ring 109 of high resistance is too large, the semiconductor short-ring 109 of high resistance can not function as a short-ring.

Further, in the method of using the semiconductor layer as the short-ring, if a channel etch type TFT is used as the switching element of the active matrix portion 103, the semiconductor layer which will be made into the short-ring must be masked by a photoresist when the semiconductor layer is produced concurrently with the TFT.

Therefore, this method can not adopt a short-cut process, in which the gap in the TFT is etched using the source and drain electrodes as the mask. In other words, since the photoresist is not used in the above short-cut process, the photoresist is not left on the semiconductor layer in the portion which will be made into the short-ring. Consequently, the semiconductor layer which is supposed to be made into the short-ring is also etched away when the channel portion (gap) of the TFT is etched.

Therefore, as previously mentioned, to protect the unwanted etching of the semiconductor layer, an additional step is necessary to form a photoresist on the semiconductor layer which will be made into the short-ring before the gap of the TFT is etched. This not only increases the number of the steps in the producing process of the active matrix substrate, but also extends the producing time as well as increasing the manufacturing costs.

SUMMARY OF THE INVENTION

It is therefore an object of the present invention to provide an active matrix substrate which can increase a margin for a static electricity and improve the production yield without increasing the number of producing steps, and a producing method of such an active matrix substrate.

To fulfill the above object, an active matrix substrate of the present invention is furnished with:

an insulating substrate;

a plurality of scanning lines and signal lines provided on the insulating substrate in a matrix pattern;

pixel electrodes, each of which being provided to areas enclosed by the scanning lines an signal lines, respectively;

switching elements electrically connected to the scanning lines, signal lines, and pixel electrodes, respectively; and a resistance control element for electrically connecting at least two lines selected arbitrary from the scanning lines and signal lines, the resistance control element being capable of varying a resistance value thereof under control in response to a voltage applied thereto.

The above active matrix substrate is furnished with the resistance control element which electrically connects at least two lines selected arbitrary from the scanning lines and signal lines and can vary a resistance value thereof under control in response to a voltage applied thereto. Thus, it has become possible to stabilize a resistance between the lines.

If the charges of an external static electricity enter into one of the scanning lines/signal lines connected to the resistance control element, the charges migrate to the other line through the resistance control element. Thus, when the resistance control element is provided between every adjacent lines, the external charges entering into any of the lines can be dispersed to the other lines through the resistance control element in a satisfactory manner.

Consequently, it has become possible to eliminate the static-induced breakdown of the pixel electrodes and switching elements in the active matrix substrate caused by friction while the active matrix substrate is transported or moved, thereby making it possible to increase a margin of the active matrix substrate for the static electricity and improve the production yield.

Also, to fulfill the above object, a producing method of an active matrix substrate of the present invention is composed of the steps of:

forming a first conductive film used as a scanning line material on an insulating substrate;

forming scanning lines, scanning electrodes, scanning electrodes of thin film transistors used as 2-terminal elements by patterning the first conductive film into a predetermined shape;

forming a first insulating layer, a first semiconductor layer, and a second insulating layer sequentially over an area including the scanning lines, scanning electrodes, and the scanning electrodes of the thin film transistors used as the 2-terminal elements;

forming a channel protecting layer by patterning the second insulating film substantially in a same shape as the scanning electrodes and the scanning electrodes of the thin film transistors used as the 2-terminal elements;

forming a second semiconductor layer which will be made into a contact layer over an area including the scanning lines, scanning electrodes, and the scanning electrodes of the thin film transistors used as the 2-terminal elements;

forming channel portions of the thin film transistors and the contact layer by patterning the first and second semiconductor layers into a predetermined shape, respectively;

forming a second conductive film which will be made into signal lines, signal electrodes, drain electrodes, signal electrodes, and drain electrodes of the thin film transistors used as the 2-terminal elements over an area including the contact layer;

forming the signal lines, signal electrodes, drain electrodes, and the signal electrodes and drain electrodes of the thin film transistors used as the 2-terminal elements by patterning the second conductive film into a predetermined shape;

forming a third conductive film which will be made into pixel electrodes; and forming the pixel electrodes by patterning said third conductive film into a predetermined shape.

According to the above producing method, the 2-terminal elements which control a resistance between the lines and the switching elements which drive the pixel electrodes can be produced concurrently. Therefore, both the 2-terminal elements and switching elements can be composed of the channel etch type thin film transistor. Thus, the producing process does not have to include a separate step to produce the 2-terminal elements that altogether constitute the short-ring for eliminating the static electricity from the switching elements. Consequently, the active matrix substrate having the short-ring can be produced in a shorter time.

For a fuller understanding of the nature and advantages of the invention, reference should be made to the ensuing detailed description taken in conjunction with the accompanying drawings.

BRIEF DESCRIPTION OF THE DRAWINGS

FIG. 4(a) is a flowchart detailing a producing method of the entire active matrix substrate of FIG. 1;

FIG. 4 (b) is a flowchart detailing a producing method of the section in the vicinity of the short-ring portion of the active matrix substrate of FIG. 1;

FIG. 11(a) is a flowchart detailing a producing method of the entire active matrix substrate of FIG. 10 (a)

FIG. 11(b) is a flowchart detailing a producing method of the section in the vicinity of the short-ring portion of the active matrix substrate of FIG. 10(a);

DESCRIPTION OF THE EMBODIMENTS

The following description will describe an example embodiment of the present invention by way of a liquid crystal display device (active matrix type liquid crystal display device) using an active matrix substrate of the present invention.

Figure 6:
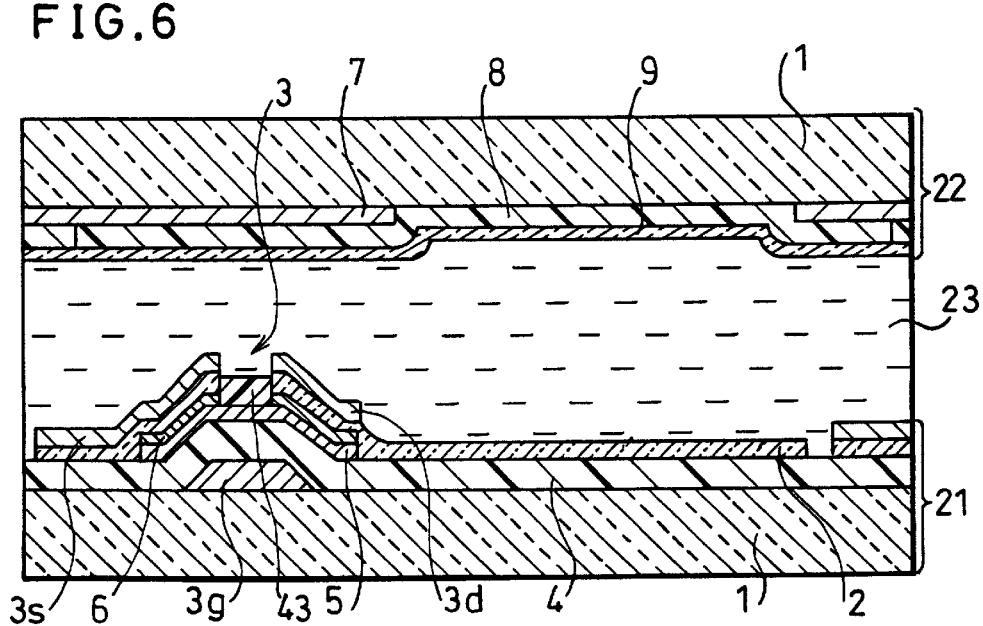
FIG. 6 is a cross section taken on line A—A of FIG. 5.

As shown in FIG. 6, an active matrix type liquid crystal display device in accordance with the present invention comprises an active matrix substrate 21, an opposing substrate 22, and a liquid crystal 23 sealed in a space between the above two opposing substrates 21 and 22.

The active matrix substrate 21 includes a transparent insulating glass substrate 1 having formed thereon pixel electrodes 2 and switching elements 3 connected to each other electrically.

A gate electrode 3g of each switching element 3, a gate insulating film 4, a semiconductor layer 5, a contact layer 6, an etching stopper 43 serving as a channel protecting layer, the pixel electrodes 2, and a drain electrode 3d and a source electrode 3s of each switching element 3 are sequentially formed on the insulating glass substrate 1 from bottom to top in the drawing.

The opposing substrate 22 includes a transparent insulating glass substrate 1 having sequentially formed thereon a photo-blocking film 7, a color filter 8, and an opposing electrode 9 from top to bottom in the drawing.

Figure 5:
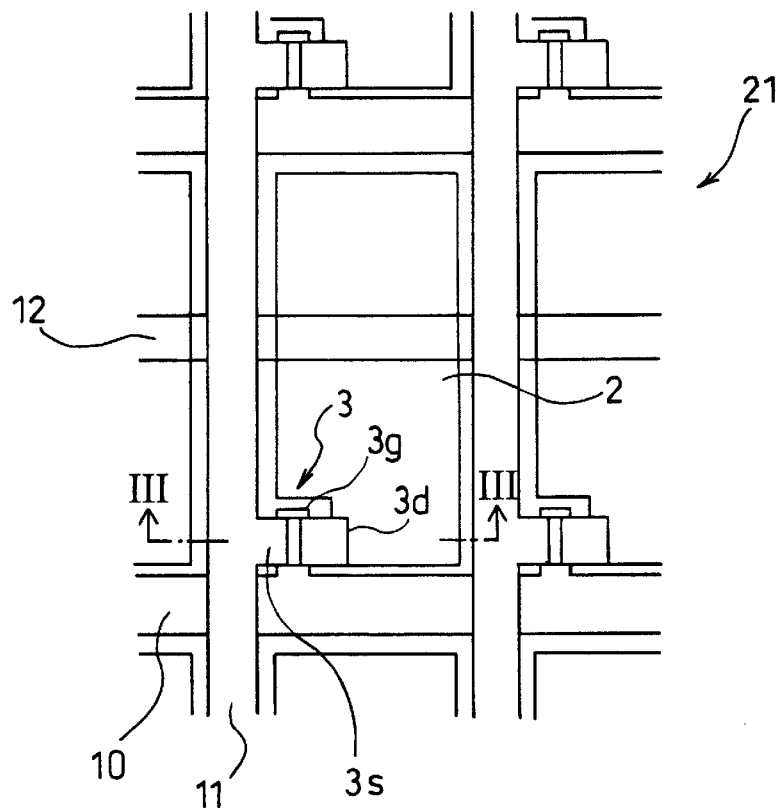
FIG. 5 is a schematic plan view showing a section in the vicinity of the pixel electrodes of the active matrix substrate of FIG. 1.

As shown in FIG. 5, a set of gate lines 10 serving as the scanning lines and a set of source lines 11 serving as the signal lines are provided on the active matrix substrate 21 in such a manner to intersect at right angles with each other. One pixel electrode 2 is provided to each area enclosed by the gate lines 10 and source lines 11.

Further, a Cs line 12 serving as an additional capacity of each pixel electrode 2 is provided below the pixel electrode 2 along the gate lines 10 and orthogonal to the source lines 11.

Each line used herein is made of a photo-blocking conductive film, such as a tantalum film and an aluminium film.

The active matrix substrate 21 will be described in detail in the following.

Figure 1:
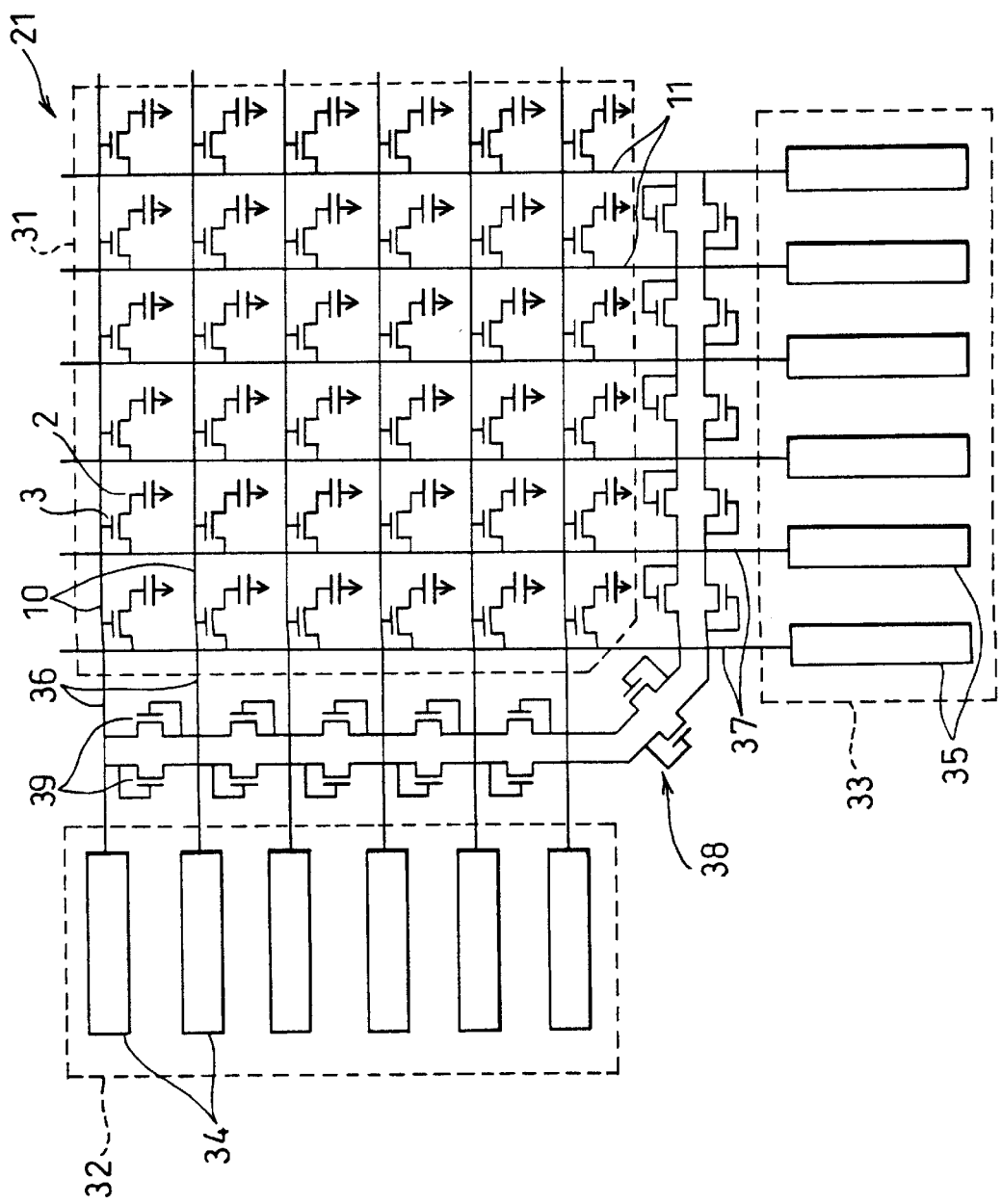
FIG. 1 is a schematic plan view of an active matrix substrate of the present invention.

As shown in FIG. 1, the active matrix substrate 21 includes an active matrix portion 31, a scanning line input terminal portion 32, and a signal line input terminal portion 33.

The active matrix portion 31 includes a matrix of the pixel electrodes 2, the switching elements 3 electrically connected to the pixel electrodes 2 individually, a plurality of the parallel gate lines 10, and a plurality of the source lines 11 aligned to intersect at right angles with the gate lines 10. In FIG. 1, the Cs lines 12 serving as the additional capacities of the pixel electrodes 2 are omitted for the explanation's convenience.

The scanning line input terminal portion 32 comprises a plurality of scanning line input terminals 34, to which the gate lines 10 are connected electrically through gate connecting lines 36, respectively. Although it is not shown in the drawing, a driving circuit is connected to each scanning line input terminal 34.

The signal line input terminal portion 33 comprises a plurality of signal line input terminals 35, to which the source lines 11 are connected electrically through source connecting lines 37, respectively. Although it is not shown in the drawing, a driving circuit is connected to each signal line input terminal 35.

Further, a short-ring 38 is provided to the gate connecting lines 36 and source connecting lines 37 which are formed between the active matrix portion 31 and the scanning line and signal line input terminal portions 32 and 33, respectively. The short-ring 38 is provided to electrically interconnect, namely, short-circuit, all the gate lines 10 and source lines 11.

The short-ring 38 comprises a plurality of 2-terminal elements (resistance control elements) 39 composed of the TFTs, which is arranged in such a manner that a pair of the 2-terminal elements connected in an inverted position in parallel are placed between every two adjacent lines, thereby short-circuiting all the lines when a predetermined voltage is applied to the 2-terminal element.

For further understanding, the 2-terminal element 39 will be explained in the following. Here, the 2-terminal element 39 connected to the gate lines 10 side is explained as an example, and since the 2-terminal element 39 connected to the source lines 11 side is of the same structure, an explanation of which is omitted herein.

Figure 2A:
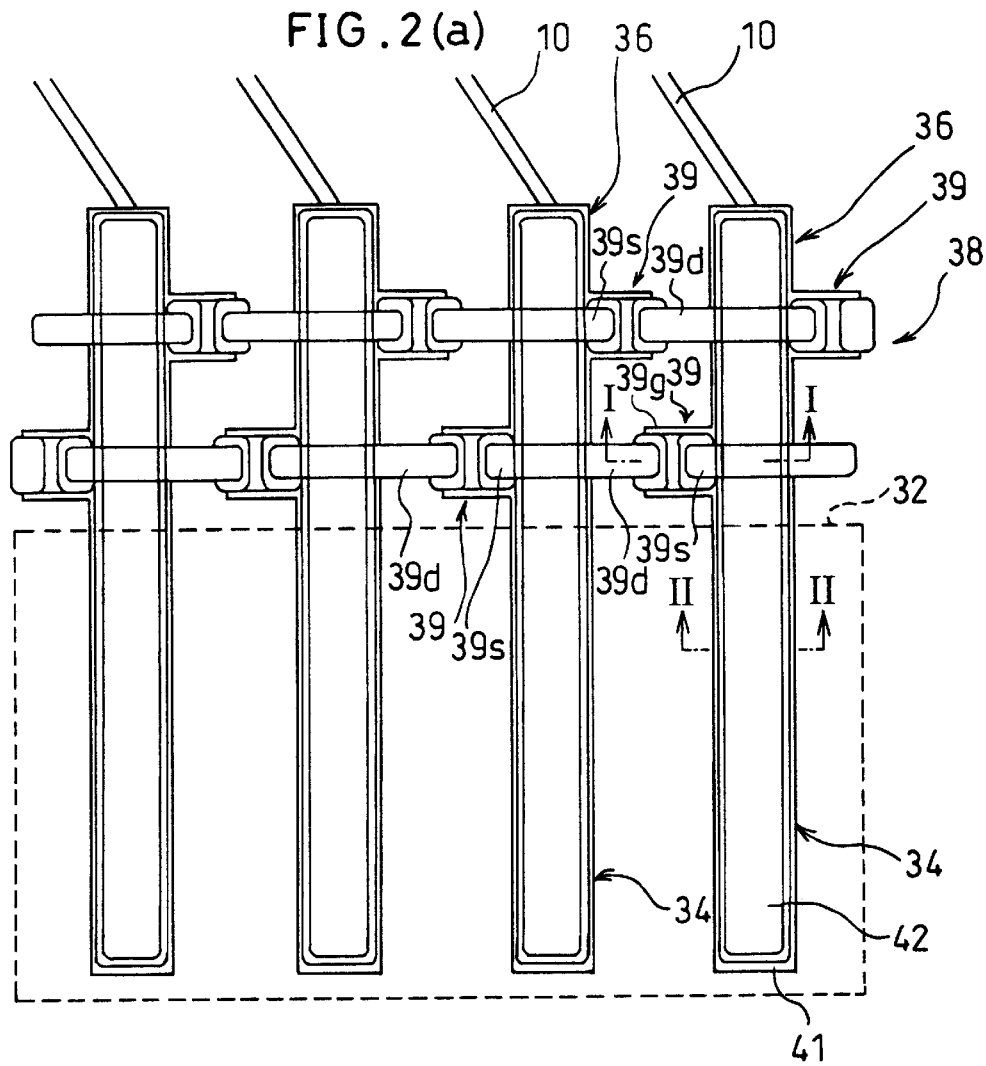
FIG. 2(a) is a schematic plan view illustrating a section in the vicinity of a short-ring portion provided to the active matrix substrate of FIG. 1.
Figure 2B:
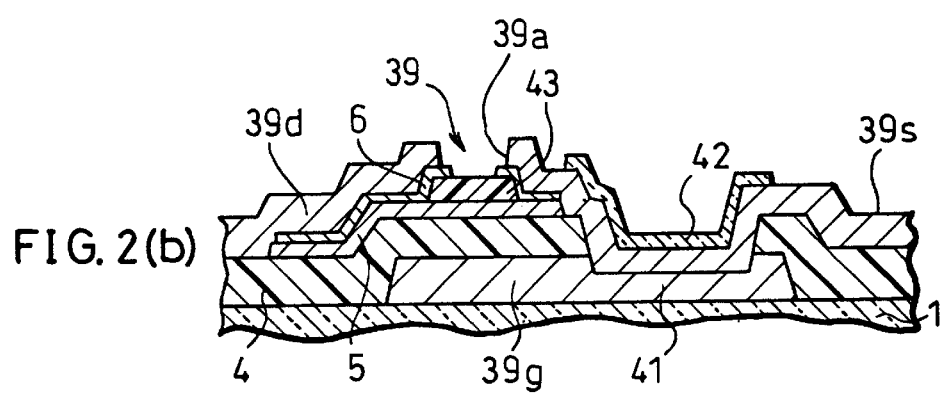
FIG. 2(b) is a cross section taken on line B—B of FIG. 2(a)
Figure 2C:
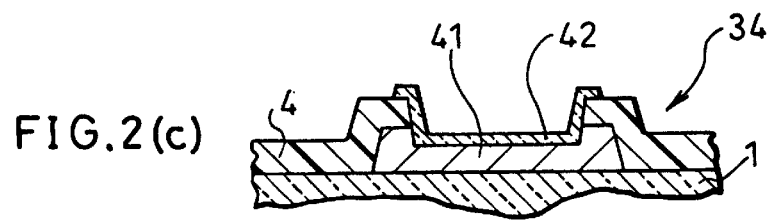
FIG. 2(c) is a cross section taken on line C—C of FIG. 2(a)

As shown in FIG. 2(a), a pair of the 2-terminal elements 39 are provided to each gate connecting line 36 to electrically interconnect the gate lines 10 and the scanning line input terminals 34. As shown in FIGS. 2(b) and 2(c), both the gate connecting lines 36 and scanning line input terminals 34 are made out of a same metal layer 41, and atop of which an ITO (indium tin oxide) film 42 is layered.

In other words, as shown in FIG. 2(b), the 2-terminal element 39 is composed of the TFT comprising a gate electrode 39g formed as an integral part of the metal layer 41, and atop of which the gate insulating film 4, semiconductor layer 5, and a drain electrode 39d and a source electrode 39s formed over a contact layer 6 are sequentially layered from bottom to top in the drawing.

The etching stopper 43 serving as a channel protecting layer is formed at a gap portion 39a of the 2-terminal element 39.

As shown in FIG. 2(a), the drain electrode 39d of one 2-terminal element 39 is connected electrically to the source electrode 39s of another 2-terminal element 39 provided to either of the adjacent gate connecting lines 36, while the source electrode 39s of the firstly mentioned 2-terminal element 39 is connected electrically to the drain electrode 39d of another 2-terminal element 39 provided to the other adjacent gate connecting line 36.

The pair of the 2-terminal elements 39 provided to the same gate connecting line 36 are connected in parallel and in such a manner that the source electrode 39s and drain electrode 39d of each 2-terminal element 39 are placed in an inverted position. In short, signals flow in opposite directions through the pair of the 2-terminal elements 39 provided to the same gate connecting line 36.

Figure 3:
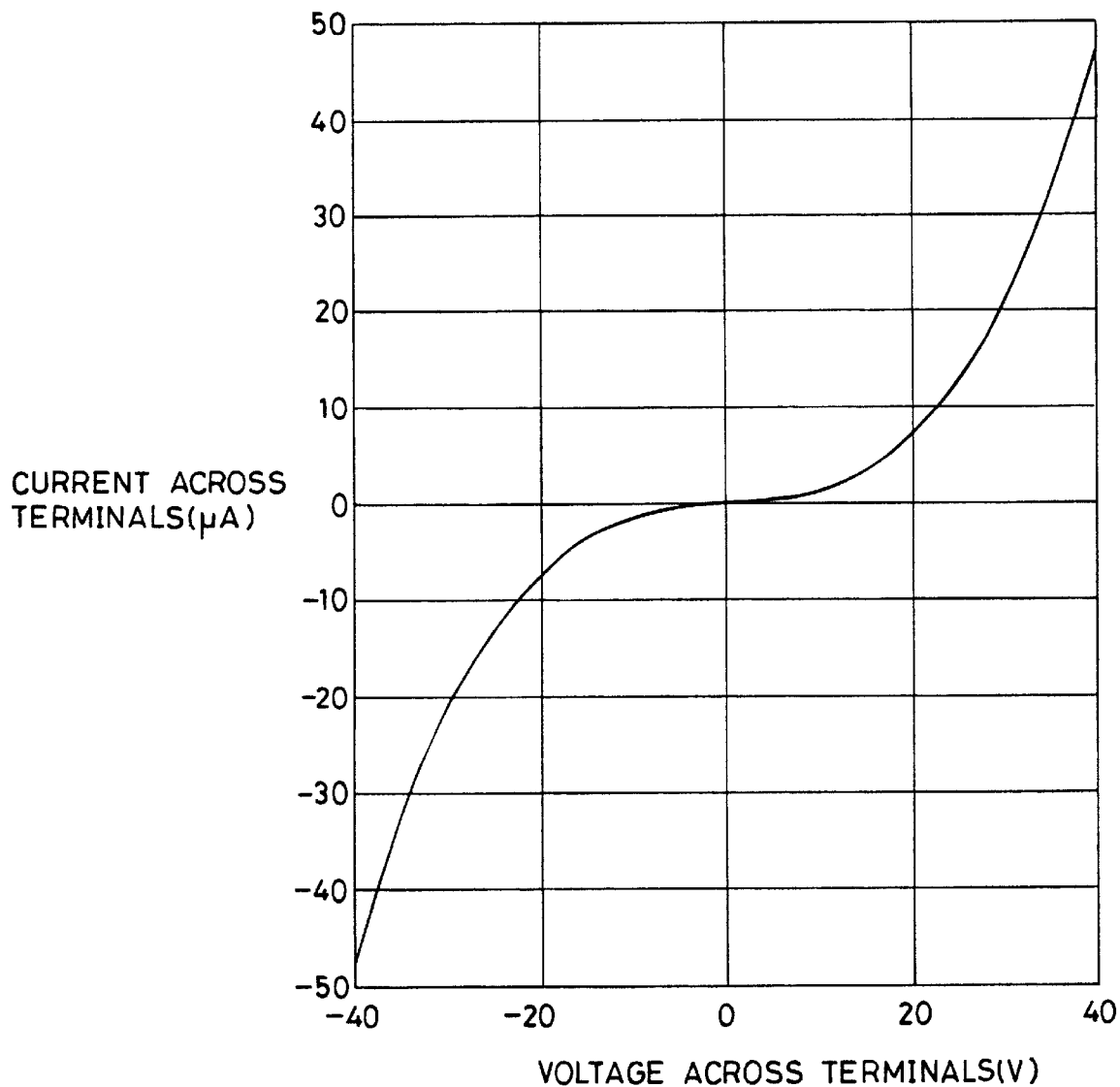
FIG. 3 is a graph showing a relation between a voltage and a current across the terminals connected through the short-ring portion.

FIG. 3 shows a graph of the I–V characteristics when a voltage is applied across two adjacent scanning line input terminals 34 each provided with the 2-terminal elements 39.

The graph reveals that when the voltage applied across the terminals is changed in a range between −40V and 40V, the current across the same varies smoothly in a range between −50 μA and 50 μA. This indicates that the 2-terminal elements 39 function as the short-ring even when a very low voltage is applied. Therefore, the 2-terminal elements 39 can function as the short-ring in response to a weak static electricity close to a point where the electrical breakdown of the semiconductor occurs.

According to the above arrangement, each 2-terminal element 39 is controlled to change its own resistance value, that is, the readiness of a current flow, in response to an applied voltage. Thus, it has become possible to stabilize a resistance value between the lines. This is because the resistance value between the lines, namely, the resistance value of the short-ring 38, is controlled using an ON resistance of the TFTs which are used as the 2-terminal elements 39. Therefore, the 2-terminal elements 39 do not cause the leakage between the input terminals that used to occur when the resistance value is too small, and can function as the short-ring even when the resistance value is too large.

The 2-terminal element 39 of the present embodiment is arranged to have a resistance value of approximately 2 MΩ when a voltage of 25V is applied across the scanning line input terminals 34. This arrangement is made on the assumption that the 2-terminal elements 39 would be used in the active matrix substrate whose gate lines 10 has a voltage of Vgh=15V and Vgl=10V.

In other words, when the largest potential difference between the voltages applied across the adjacent bus lines is 25V, the resistance value between the terminals is set in such a manner that the signals of the applied voltages Vgh and Vgl do not affect each other.

At the same time, the resistance value between the terminals must be set in such a manner that the unillustrated driver connected to each scanning line input terminal 34 does not effect an excessive current protecting operation when the power source is turned on.

A producing method of the above-arranged active matrix substrate 21 will be explained in the following with reference to FIGS. 4(a) and 4(b). FIG. 4(a) is a flowchart detailing a producing method of the entire active matrix substrate 21, and FIG. 4(b) is a flowchart detailing a producing method of a section in the vicinity of the short-ring portion of the active matrix substrate 21.

To begin with, the gate lines, gate electrodes, scanning and signal input terminals are made out of a scanning line material (hereinafter, referred to as gate material) formed as a first conductive film in the entire active matrix substrate (S1). To be more specific, the transparent insulating glass substrate 1 is coated with a 3000 Å-thick Ta film, namely the scanning line material, through the sputtering. Then, the Ta film is patterned through the photolithography and etched away, whereby the gate lines 10, gate electrodes 3g serving as the scanning electrodes of the switching elements 3, the gate connecting lines 36 extended from the gate lines 10, scanning line input terminals 34, and signal line input terminals 35 are formed.

As shown in FIG. 4(b), first electrodes of the 2-terminal elements are formed in the section in the vicinity of the short-ring portion concurrently with Si (S1'). To be more specific, the gate electrodes 39g are formed as the first electrodes of the 2-terminal elements 39 which altogether constitute the short-ring 38 by modifying the forming pattern of the gate connecting lines 36 partially.

Here, in S1 and S1', the etching of the Ta film can be carried out by either the dry etching method which uses a plasma of a mixed gas of $CF_4O_2$, or wet etching method which uses an etching liquid, namely, a mixed liquid of hydrofluoric acid and nitric acid.

However, in case of the wet etching method, a $Ta_2O_5$ film having a thickness ranging from 1000 Å to 10000 Å must be formed between the insulating glass substrate 1 and Ta film to prevent the unwanted etching of the insulating glass substrate 1. This means that the number of the steps is greater in the wet etching method than in the dry etching method. For this reason, the dry etching method is adopted as the method of etching the Ta film herein.

In addition, although Ta (tantalum) is used as the gate material herein, Al (aluminium) and Mo (molybdenum) or an alloy of these elements are also applicable.

Then, a gate insulating film (first insulating layer) which will be used as the gate insulating film 4, and a semiconductor layer (first semiconductor layer) which will be used as the semiconductor layer 5, and an etching stopper film (second insulating layer) which will be used as the etching stopper (ES) layer 43 are formed on the gate material layered over the insulating glass substrate 1 (S2). More specifically, a 3000 Å-thick SiNx film, a 300 Å-thick a-Si(i) film, and a 2000 Å-thick SiNx film are formed sequentially in this order on the gate material layered on the insulating glass substrate 1 through the plasma CVD method as the gate insulating film 4, semiconductor layer 5, and etching stopper layer 43, respectively.

Concurrently with S2, a gate insulating film to be used as the gate insulating film 4 out of which the 2-terminal elements 39 that altogether constitute the short-ring 38 will be made, a semiconductor layer which will be used as the semiconductor layer 5, and an etching stopper film which will be used as the etching stopper (ES) layer 43 are formed in the section in the vicinity of the short-ring portion (S2').

Subsequently, the etching stopper layer 43 is patterned in both the entire active matrix substrate and the section in the vicinity of the short-ring portion (S3 and S3').

To be more specific, in S3 and S3', an area which will be made into the pixel electrodes 2 and an area which will be made into the 2-terminal elements 39 that altogether constitute the short-ring 38 are patterned through the photolithography, and only the SiNx film on the top is etched away with a BHF liquid (hydrofluoric acid and ammonium fluoride) to leave the etching stopper layer 43 alone.

Alternatively, a 3000 Å-thick $Ta_2O_5$ film may be formed by anodizing the surface of the gate lines 10 and the surface of the gate electrodes 3g of the switching elements 3 before the gate insulating film 4 is formed by the plasma CVD method to ensure the insulation.

Then, an n+ layer (second semiconductor layer) which will be used as the contact layer 6 is formed over the semiconductor layer which will be used as the semiconductor layer 5 in both the entire active matrix substrate and the section in the vicinity of the short-ring portion (S4 and S4'). More specifically, a 400 Å-thick a-Si(n+) film or μc-Si(n+) film is formed over the semiconductor layer 5 as the n+ layer through the plasma CVD method.

Then, the semiconductor layer and n+ layer are patterned in both the entire active matrix substrate and the section in the vicinity of the short-ring portion (S5 and S5'). More specifically, the a-Si(n+) film or μc-Si(n+) film and the a-Si(i) film are patterned into an insular shape concurrently through the photolithography and etching, whereby the contact layer 6 is made out of the a-Si(n+) film or μc-Si(n+) layer and the semiconductor layer 5 is made out of the a-Si(i) film.

Then, the gate insulating film (SiNx film) is patterned at a portion corresponding to the terminal portion of the driver ICs and bus lines in the entire active matrix substrate 21 (S6). Concurrently with S6, the insulating film (SiNx film) over the first electrode connecting portion which will be made into the gate electrodes 39g of the 2-terminal elements 39 is patterned in the section in the vicinity of the short-ring portion (S6').

Then, the SiNx film is etched away, whereby contact holes are made as connecting portions through which the driver ICs and bus lines are connected to each other. In case that the $Ta_2O_5$ film is formed before the gate insulating film 4 is formed, the $Ta_2O_5$ is etched away with the SiNx film.

Then, the source lines 11, and source electrodes 3s and drain electrodes 3d of the switching elements 3 are made out of a source material (second conductive film) in the entire active matrix substrate (S7).

Concurrently with S7, the connecting lines, first electrodes, and second electrodes are formed in the section in the vicinity of the short-ring portion (S7'). More specifically, the gate connecting lines 36 and source connecting lines 37, source electrodes 39s, and drain electrodes 39d are formed as the connecting lines, first electrodes, and second electrodes, respectively.

In other words, in S7 and S7', the insulating glass substrate 1 is coated entirely with a 3000 Å-thick metal thin film made of Ti used as the source material through the sputtering. Then, the metal thin film is patterned through the photolithography and etched away, whereby the source electrodes 3s and drain electrodes 3d of the switching elements 3, source lines 11, the source electrodes 39s and drain electrodes 39d of the 2-terminal elements 39 that altogether constitute the short-ring 38 are formed.

Although Ti is used for the metal thin film herein, Mo, Al, or an Al alloy can be used as well.

Then, the pixel electrodes 2 are made out of a third conductive film in the entire active matrix substrate (S8). More specifically, a 1500 Å-thick ITO film is formed through the sputtering as the third conductive film, and out of which the pixel electrodes 2 are formed through the subsequent photolithography and etching. The ITO film may be patterned to be left on the source lines 11, so that the active matrix substrate 21 has a redundant structure for preventing the line breaking of the source lines 11.

Concurrently with S8, an ITO film is formed over the metal layer 41 which will be made into the scanning line input terminals 34, and the ITO film 42 is formed through the subsequent photolithography and etching (S8').

Figure 7A:
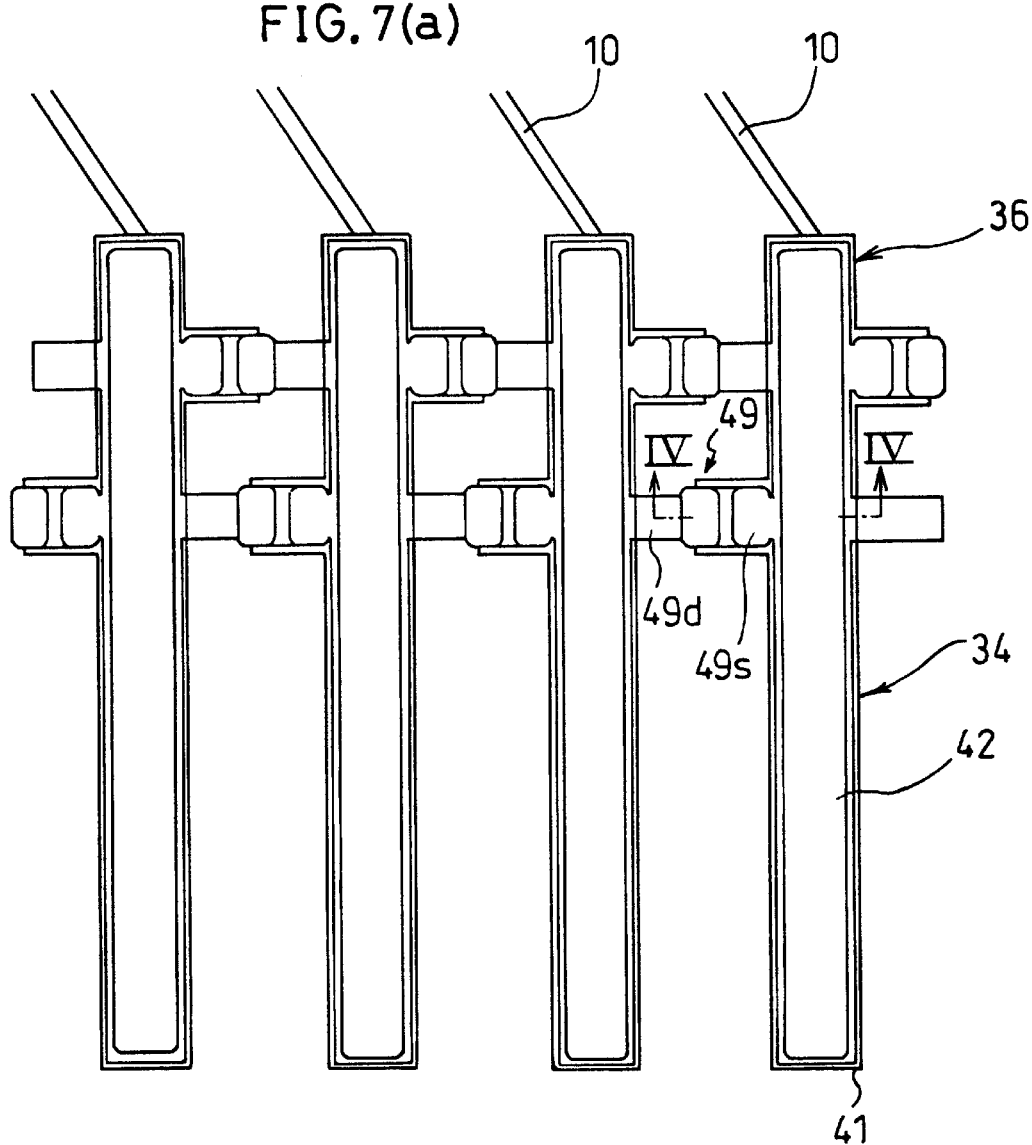
FIG. 7(a) is a schematic cross section of a section in the vicinity of another short-ring portion provided to the active matrix substrate.
Figure 7B:
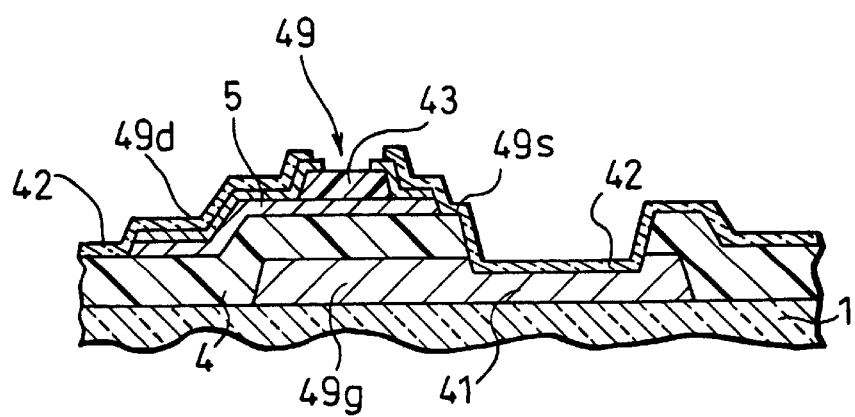
FIG. 7(b) is a cross section taken on line D—D of FIG. 7(a)

The source electrodes 39s and drain electrodes 39d of the TFTs used as the 2-terminal elements 39 that altogether constitute the short-ring 38 are made out of the source metal film herein. However, as shown in FIGS. 7(a) and 7(b), the 2-terminal element 39 can be replaced with a 2-terminal element 49 made out of the conductive film out of which the pixel electrodes are also made, which will be described in the following.

Each 2-terminal element 49 comprises a gate electrode 49g formed as an integral part of the metal layer 41, and a source electrode 49s and a drain electrode 49d made out of the conductive ITO film 42.

Alternatively, the source electrode and drain electrode of the 2-terminal element may be made out of both the source metal film and conductive film to give the redundancy to the short-ring 38.

Finally, a 3000 Å-thick SiNx film serving as the protecting film is formed through the plasma CVD method to cover the entire portion where the electrodes are formed on the insulating glass substrate 1. Then, the SiNx film is patterned through the photolithography, and etched away with the BHF liquid (hydrofluoric acid+ammonium fluoride), whereby the SiNx film on the pixel electrodes 2 is removed and the active matrix substrate 21 is produced.

Then, an orientation film made of, for example, polyimide, is applied on the surface of the active matrix substrate 21 where the pixel electrodes 2 are formed through the printing method. Subsequently, the same orientation treatment is applied to the opposing substrate 22 having the color filter 8 of FIG. 6 in the same manner. Then, the active matrix substrate 21 and opposing substrate 22 are laminated to each other through an unillustrated sealing material, and the liquid crystal 23 is filled in the space between the above two substrates 21 and 22, whereby the active matrix type liquid crystal display device is assembled.

In the active matrix substrate 21 produced in the above manner, a pair of the 2-terminal elements 39 composed of TFTs are connected in an inverted position in parallel and placed in every two adjacent gate connecting lines 36 and source connecting lines 37 as shown in FIG. 1.

Therefore, if an external static electricity enters into any of the input terminals, the entering charges open the gates of the 2-terminal elements 39 that altogether form the short-ring 38, and are dispersed to the adjacent input terminals to the following input terminals sequentially.

Consequently, compared with an active matrix substrate having no short-ring 38, the frequency of the occurrence of the electrical breakdown and characteristics displacement of the TFTs caused by the static electricity can be reduced significantly.

Thus, according to the active matrix substrate of the present invention, the short-ring does not have to be removed before the driver ICs are connected like in the case where the semiconductor layer is used as the short-ring. Thus, the adverse effect of the static electricity can be eliminated in the steps not only before but also after the driver ICs are mounted to the active matrix substrate.

In addition, since the resistance of the short-ring is controlled using the ON resistance of the TFTs, the resistance of the short-ring can be stabilized.

Moreover, according to the above active matrix substrate, the higher the applied potential to each input terminal, the lower the resistance value of the short-ring. Therefore, compared with the semiconductor short-ring connected in series, a greater amount of charges can be dispersed.

Further, the above active matrix substrate is arranged in such a manner that the signals flow through a pair of the 2-terminal elements 39 connected to the same connecting line in an inverted position in parallel and constituting the short-ring 38. Thus, the 2-terminal elements 39 can serve as the short-ring even when an amount of the charges is very small.

The 2-terminal elements may be connected in series in alternating directions. However, in this case, the resistance of the resulting short-ring becomes too large to efficiently disperse the static electricity to each input terminal in response to the charges below the breakdown voltage of the 2-terminal elements.

Figure 8:
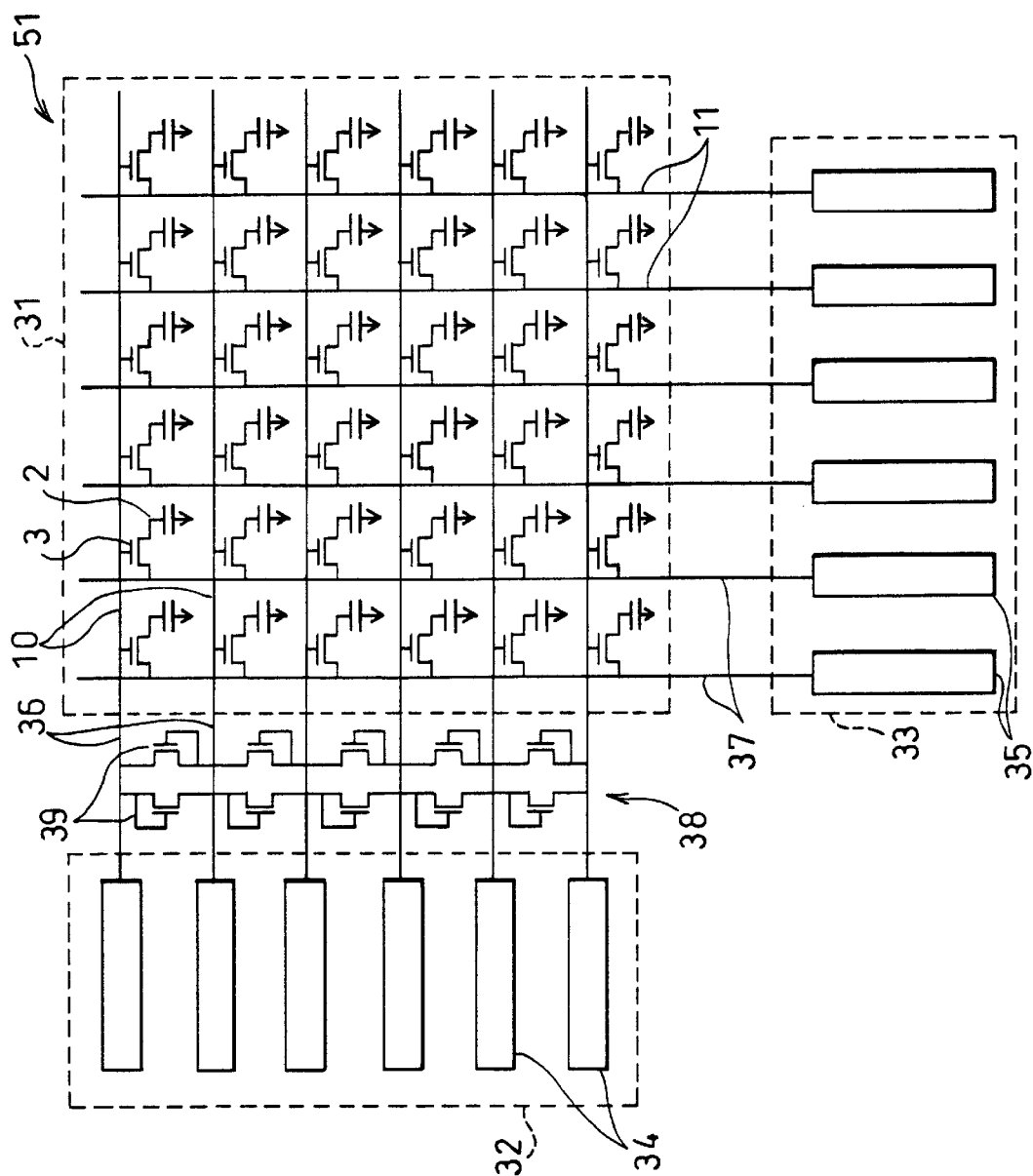
FIG. 8 is a schematic plan view of an active matrix substrate having a short-ring in a scanning line input terminal portion side alone.
Figure 9:
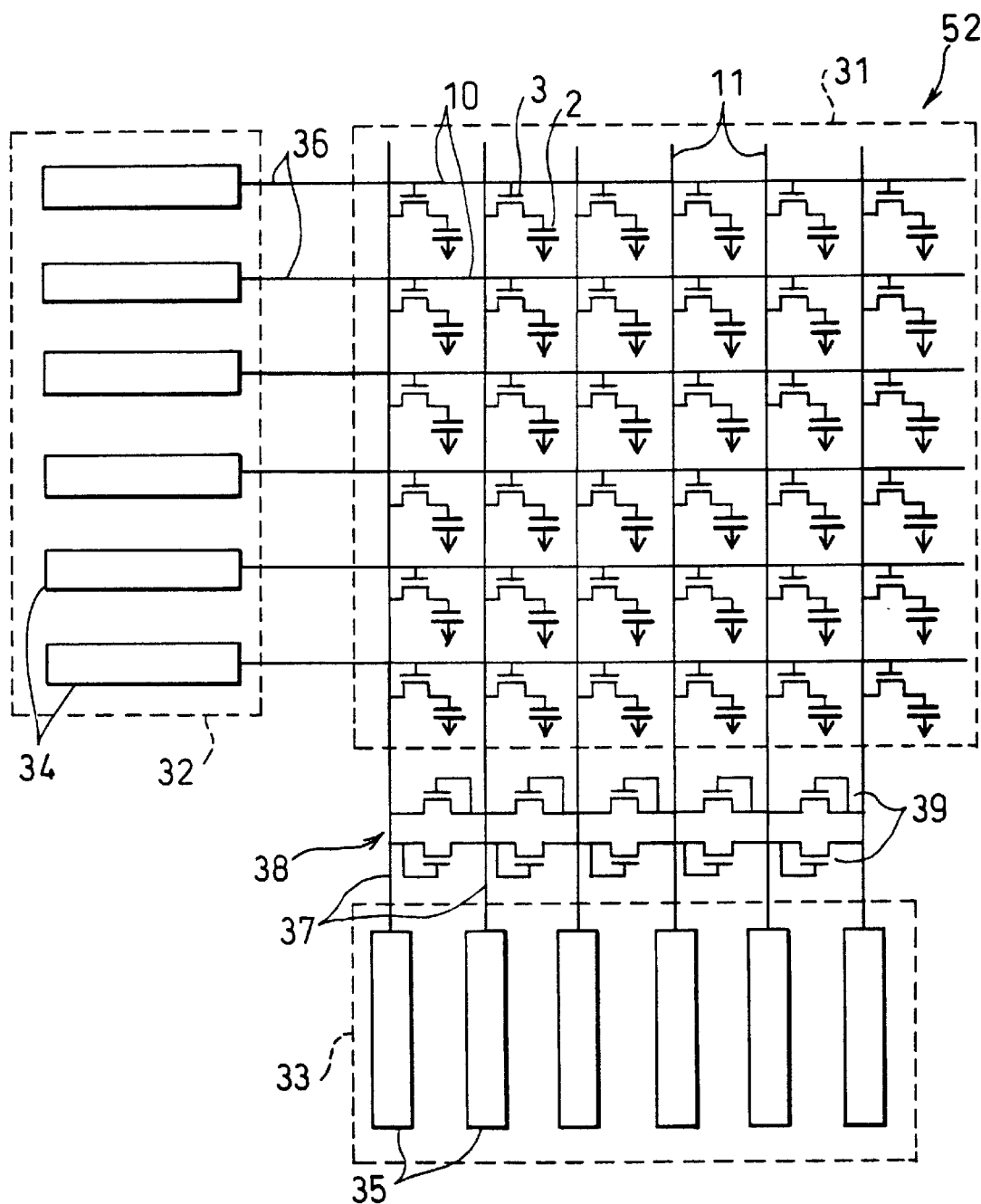
FIG. 9 is a schematic plan view of an active matrix substrate having the short-ring in a signal line input terminal portion side alone.

In the present embodiment, the short-ring 38 is formed between the active matrix portion 31 and the scanning line and signal line input terminal portions 32 and 33 as shown in FIG. 1. However, the position of the short-ring 38 can be modified as shown in FIG. 8, for example. That is, the short-ring 38 may be formed between the active matrix portion 31 and scanning line input terminal portion 32 alone. Likewise, as shown in FIG. 9, the short-ring 38 may be formed between the active matrix portion 31 and the signal line input terminal portion 33 alone.

As shown in FIGS. 2(b) and 7(b), each of the 2-terminal elements 39 that altogether constitute the short-ring 38 is composed of the TFT having the etching stopper layer 43 to prevent the unwanted etching of the channel portion of the semiconductor layer 5 herein. However, a channel-etch type TFT having no etching stopper layer 43 can be used as the 2-terminal element as well.

In the following, an active matrix substrate using the channel-etch type TFTs as the 2-terminal elements that altogether constitute the short-ring 38 will be explained.

Figure 10A:
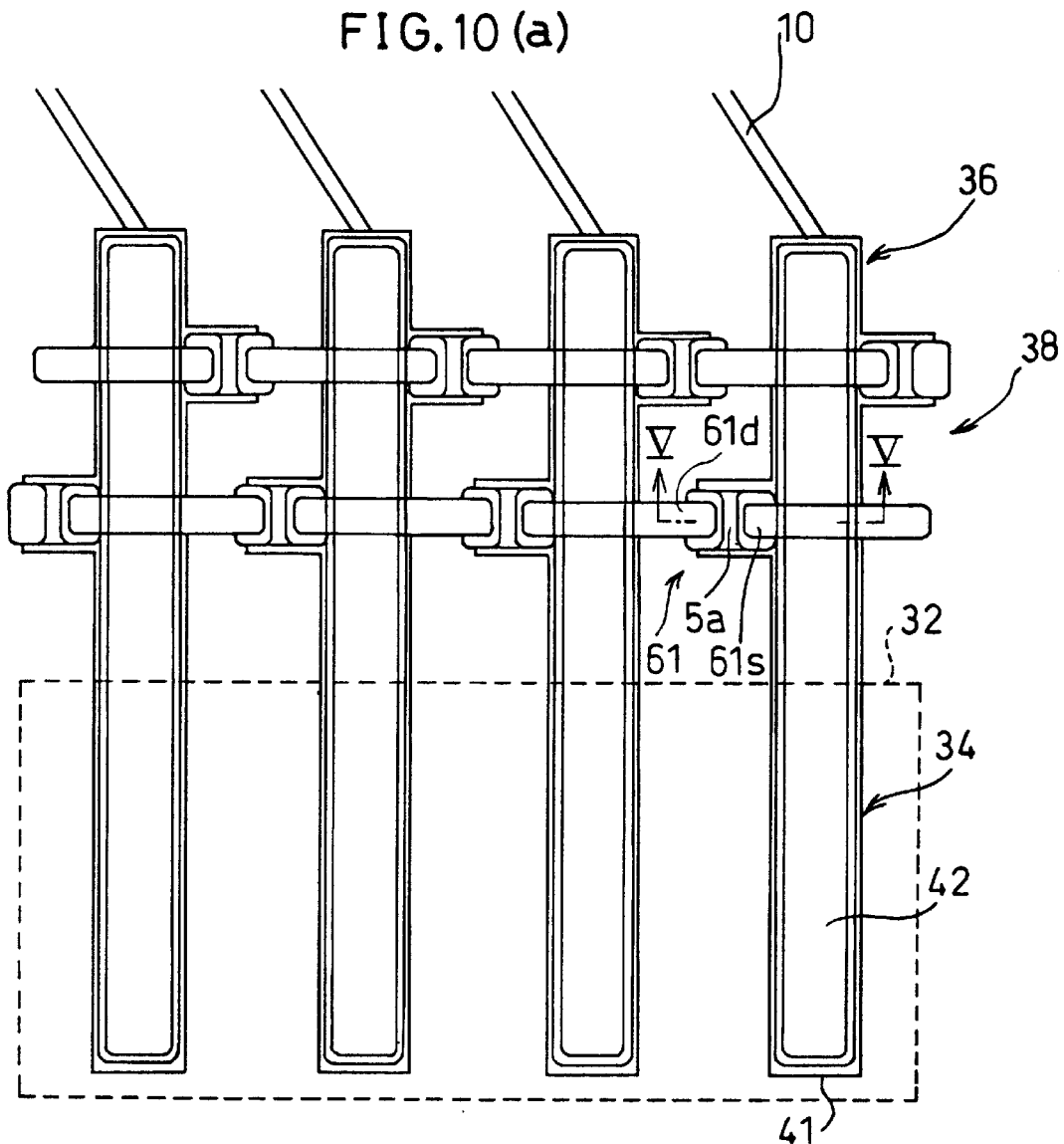
FIG. 10(a) is a schematic plan view showing a section in the vicinity of a further short-ring portion provided to the active matrix substrate.
Figure 10B:
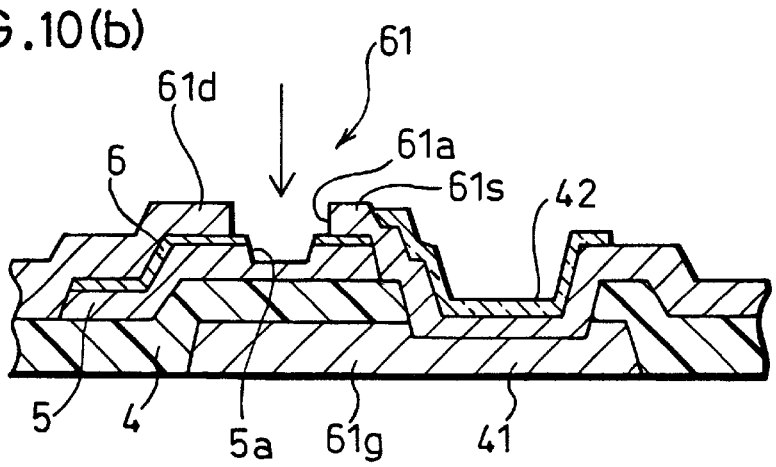
FIG. 10 (b) is a cross section taken on line E—E of FIG. 10(a)

An example channel-etch type TFT is shown in FIG. 10(b) as a 2-terminal element 61, which comprises a gate electrode 61g formed as an integral part of the metal layer 41, the gate insulating film 4, the semiconductor layer 5, and a source electrode 61s and a drain electrode 61d formed over the contact layer 6.

In the 2-terminal element 61, the semiconductor layer 5 and contact layer 6 are etched away concurrently inside a gap portion 61a.

Here, a producing method of the active matrix substrate using the 2-terminal elements 61 will be explained with reference to FIGS. 10(a) and 10(b) and FIGS. 11(a) and 11(b). FIG. 11(a) is a flowchart detailing a producing method of the entire active matrix substrate, and FIG. 11(b) is a flowchart detailing a producing method of a section in the vicinity of the short-ring portion of the active matrix substrate.

To begin with, the gate lines, gate electrodes, scanning and signal input terminals are made out of a gate material (first conductive film) in the entire active matrix substrate (S11). To be more specific, like S1 of FIG. 4(a), the gate lines 10, gate electrodes 3g serving as the scanning electrodes of the switching elements 3, gate connecting lines 36 extended from the gate lines 10, and scanning line input terminal portion 32 and signal line input terminal portion 33 are formed.

Concurrently with S11, the first electrodes of the 2-terminal elements are formed in the section in the vicinity of the short-ring portion (S11'). To be more specific, like S1' of FIG. 4(b), the gate electrodes 61 serving as the first electrodes of the 2-terminal elements 61 that altogether form the short-ring 38 are formed.

Then, a gate insulating film (first insulating film), a semiconductor layer (first semiconductor layer), and an n+ layer (second semiconductor layer) are formed on the gate material layered on the insulating glass substrate 1, which will be used as the gate insulating film 4, semiconductor layer 5, and contact layer 6, respectively (S12) More specifically, a 3000 Å-thick SiNx film, a 300 Å-thick a-S1 (i) film, and a 400 Å-thick a-Si(n+) film or μc-Si(n+) film are formed on the gate material layered on the insulating glass substrate 1 through the plasma CVD method as the gate insulating film 4, semiconductor layer 5, and contact layer 6, respectively.

Concurrently with S12, an insulating film, a semiconductor layer, and an n+ layer are formed in the section in the vicinity of the short-ring portion, which will be used as the gate insulating film 4, semiconductor layer 5, and contact layer 6, respectively (S12').

Subsequently, the semiconductor layer and n+ layer are patterned in both the entire active matrix substrate and the section in the vicinity of the short-ring portion (S13 and S13'). More specifically, in S13 and S13', an area which will be made into the pixel electrodes 2 and an area which will be made into the 2-terminal elements 61 that altogether constitute the short-ring 38 are patterned through the photolithography, and the a-Si(i) film which will be used as the semiconductor layer 5, and the n+ layer made of the a-Si(n+) film or μc-Si(n+) film are patterned into an insular shape concurrently through the dry etching method.

Then, a gap portion of the n+ layer is patterned in both the entire active matrix substrate and the section in the vicinity of the short-ring portion (S14 and S14').

In other words, in S14 and S14', both the a-Si(i) film which will be used as the semiconductor layer 5 and the n+ layer made of the a-Si(n+) film or μc-Si(n+) film which will be used as the contact layer 6 patterned into the insular shape in S13 and S13' are separated into the source electrode 3s side and drain electrode 3d side in each switching element 3, and into the source electrode 61s side and drain electrode 61d side in each 2-terminal element 61 through the photolithography to form the channel portion in each of the switching elements 3 and 2-terminal elements 61, respectively. The dry etching method using a ($SF_6$+HCl)-based gas is adopted for the above separating action. Here, a gap portion 61a in each 2-terminal element 61 is etched in such a manner to leave the a-Si(i) film of 500 Å-thick, so that the same will be used as the semiconductor layer 5.

Subsequently, like S6 of FIG. 4(a), the insulating film (SiNx film) is patterned at a portion corresponding to the driver ICs in the entire active matrix substrate (S15). Then, the SiNx film is etched away, whereby contact holes are made as connecting portions through which the driver ICs and the bus lines are connected to each other.

Concurrently with S15 and like S6' of FIG. 4(b), the insulating film (SiNx film) over the first electrode connecting portions which will be made into the gate electrodes 61g of the 2-terminal elements 61 is patterned in the section in the vicinity of the short-ring portion (S15'). Subsequently, the SiNx film is etched away, whereby the contact holes are made as connecting portions through which the driver ICs and bus lines are connected to each other.

Then, the source lines 11, and source electrodes 3s and drain electrodes 3d of the switching elements 3 are made out of a source material (second conductive film) in the entire active matrix substrate (S16).

Concurrently with S16, the connecting lines, first electrodes, and second electrodes are formed in the section in the vicinity of the short-ring portion (S16'). To be more specific, the gate connecting lines 36 and source connecting lines 37 are formed as the connecting lines, and in addition to the drain electrodes 61d, the gate electrodes 61g and source electrodes 61s are formed as the first and second electrodes of the 2-terminal elements 61, respectively.

Subsequently, the pixel electrodes 2 are made out of a third conductive film in the entire active matrix substrate (S17). To be more specific, a 1500 Å-thick ITO film is formed through the sputtering as the third conductive film, and out of which the pixel electrodes 2 are formed through the subsequent photolithography and etching.

Concurrently with S17, an ITO film is formed on the metal layer 41 which will be made into the scanning line input terminals 34, and an ITO film 42 is formed through the subsequent photolithography and etching (S17').

Then, the active matrix substrate using the channel-etch type TFTs both in the active matrix portion 31 and short-ring 38 is produced in the above manner.

According to the above producing method, the channel portions are made in the switching elements 3 connected to their respective pixel electrodes 2 and the 2-terminal elements 61 that altogether constitute the short-ring 38 by etching the semiconductor layer 5 and contact layer 6 concurrently. Thus, it has become possible to adopt the short-time process, in which the source conductive film or pixel conductive film is used as the photo-mask when the channel portions are etched.

Figure 12A:
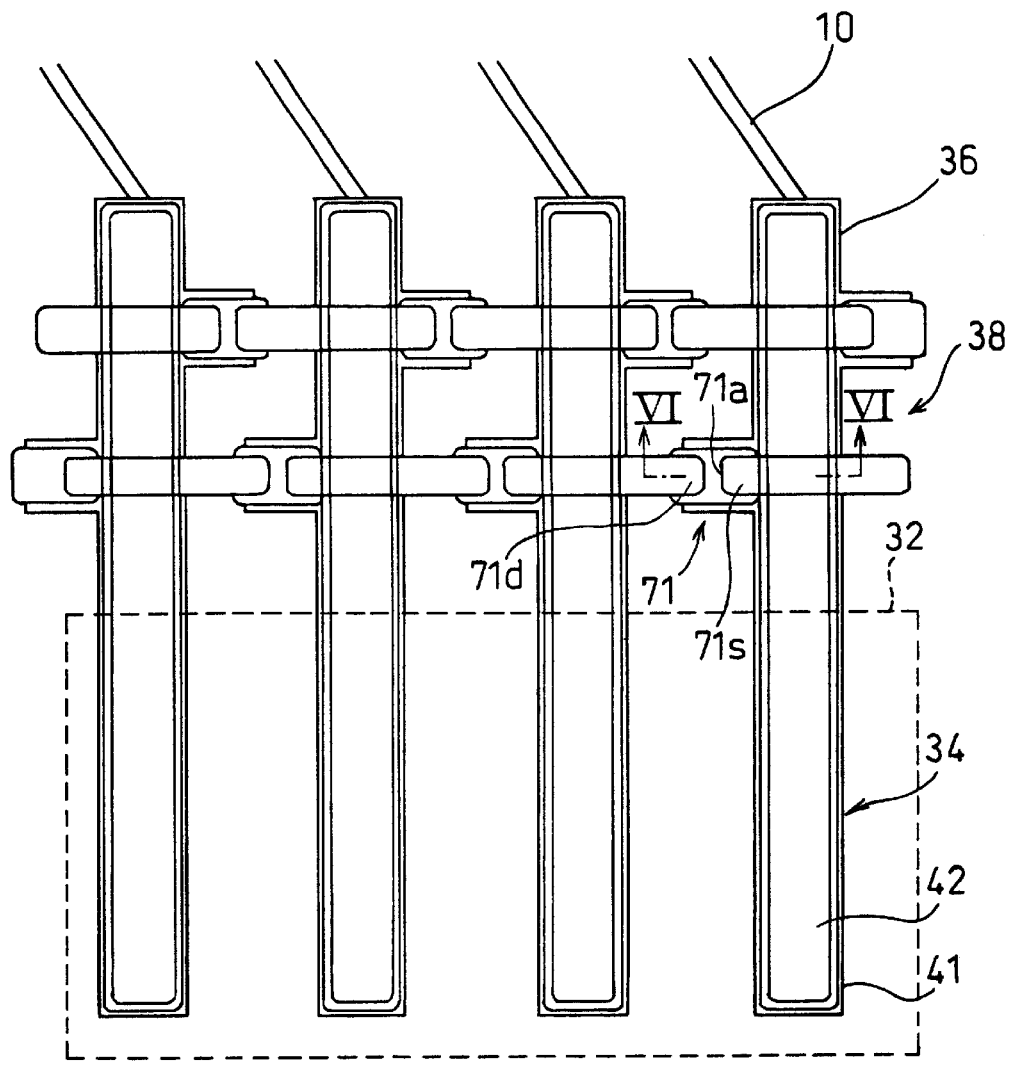
FIG. 12(a) is a schematic plan view showing a section in the vicinity of still another short-ring portion provided to the active matrix substrate.
Figure 12B:
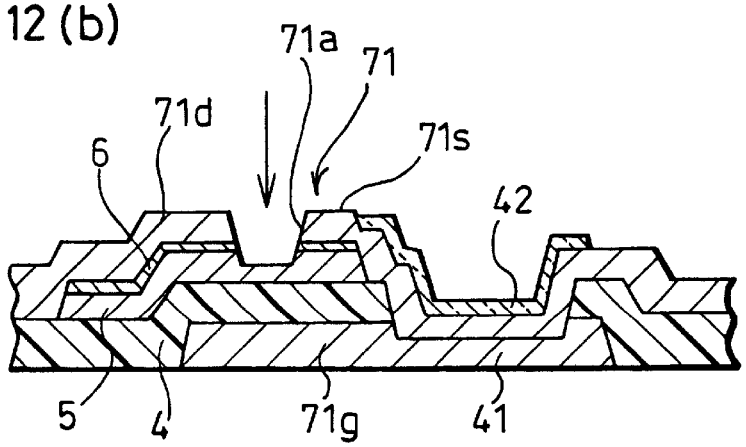
FIG. 12(b) is a cross section taken on line F—F of FIG. 12(a)

As shown in FIG. 12(b), an active matrix substrate produced through the above short-cut process uses 2-terminal elements 71 that altogether constitute the short-ring 38, and each of which comprises a gate electrode 71g formed as an integral part of the metal layer 41, the gate insulating film 4, the semiconductor layer 5, and a source electrode 71s and a drain electrode 71d formed over the contract layer 6.

In each 2-terminal element 71, the semiconductor layer 5 and contact layer 6 are etched concurrently inside gap portions 71a using the source electrodes 71s and drain electrodes 71d of the 2-terminal elements 71 as the mask.

Figure 13:
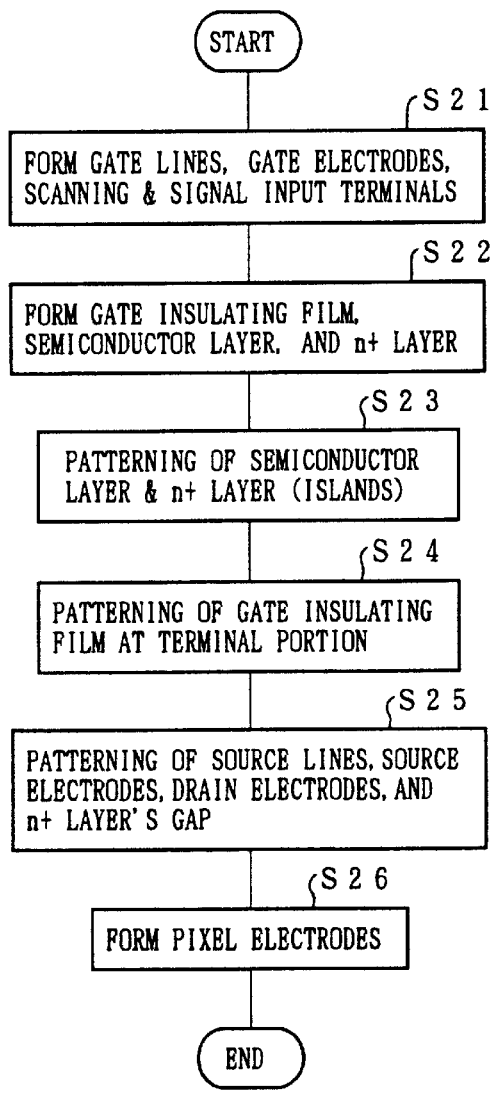
FIG. 13(a) is a flowchart detailing a producing method of the entire active matrix substrate of FIG. 12(a)
FIG. 13(b) is a flowchart detailing a producing method of the section in the vicinity of the short-ring portion of the active matrix substrate of FIG. 12(a)
Figure 13:
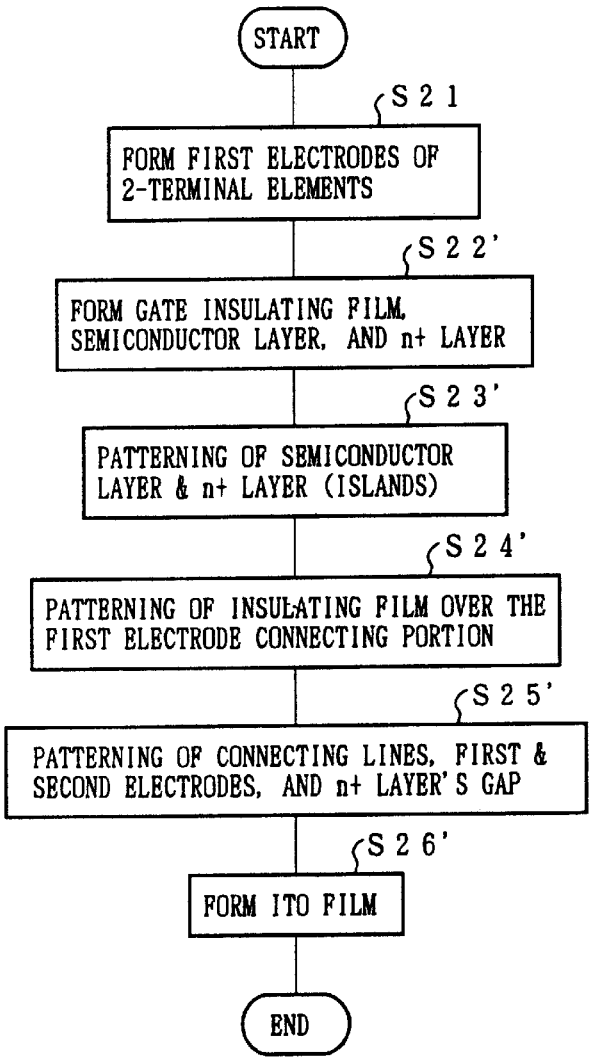

Here, a producing method of the active matrix substrate using the 2-terminal elements 71 will be explained with reference to FIGS. 12(a) and 12(b) and FIGS. 13(a) and 13(b). FIG. 13(a) is a flowchart detailing a producing method of the entire active matrix substrate, and FIG. 13(b) is a flowchart detailing a producing method of the section in the vicinity of the short-ring portion.

To begin with, the gate lines, gate electrodes, gate and source input terminals are formed out of a gate material (first conductive film) in the entire active matrix substrate (S21). Like S11 of FIG. 11(a), the gate lines 10, gate electrodes 3g serving as the scanning electrodes of the switching elements 3, gate connecting lines 36 extended from the gate lines 10, and scanning line input terminal portion 32 and signal line input terminal portion 33 are formed.

Concurrently with S21, the first electrodes of the 2-terminal elements 71 are formed in the section in the vicinity of the short-ring portion (S21'). Like S11' of FIG. 11(b), the gate electrodes 72g serving as the first electrodes of the 2-terminal elements 71 that altogether constitute the short-ring 38 are formed.

Then, a gate insulating film (first insulating film), a semiconductor layer (first semiconductor layer), and an n+ layer (second semiconductor layer) are formed on the gate material layered on the insulating glass substrate 1, which will be used as the gate insulating film 4, semiconductor layer 5, and contact layer 6, respectively (S22). More specifically, a 3000 Å-thick SiNx film, a 300 Å-thick a-Si(i) film, and a 400 Å-thick a-Si(n+) film or μc-Si(n+) film are formed on the gate material layered on the insulating glass substrate 1 through the plasma CVD method as the gate insulating film 4, semiconductor layer 5, and contact layer 6, respectively.

Concurrently with S22, an insulating film, a semiconductor layer, and an n+ layer are formed in the section in the vicinity of the short-ring portion, which will be used as the gate insulating film 4, semiconductor layer 5, contact layer 6, respectively (S22').

Subsequently, the semiconductor layer and n+ layer are patterned in both the entire active matrix substrate and the section in the vicinity of the short-ring portion (S23 and S23'). More specifically, in S23 and S23', an area which will be made into the pixel electrodes 2 and an area which will be made into the 2-terminal elements 71 that altogether constitute the short-ring 38 are patterned through the photolithography, and the a-Si(i) film which will be used as the semiconductor layer 5, and n+ layer made of the a-Si(n+) film or μc-Si(n+) film are patterned into an insular shape concurrently through the dry etching method.

Then, like S16 of FIG. 11(a), the insulating film (SiNx film) is patterned at a portion corresponding to the driver ICs in the entire active matrix substrate (S24). Then, the SiNx film is etched away, whereby contact holes are made as connecting portions through which the driver ICs and the bus lines are connected to each other.

Concurrently with S24 and like S16' of FIG. 11(b), the insulating film (SiNx film) over the first electrode connecting portions which will be made into the gate electrodes 61g of the 2-terminal elements 71 is patterned (S24'). Then, the SiNx film is etched away, whereby the contact holes are made as connecting portions through which the driver ICs and bus lines are connected to each other.

Then, the source lines 11, and source electrodes 3s and drain electrodes 3d of the switching elements 3 are made out of a source material (second conductive film) in the entire active matrix substrate (S25).

Concurrently with S25, the connecting lines, first electrodes, and second electrodes are formed in the section in the vicinity of the short-ring portion (S25'). To be more specific, the gate connecting lines 36 and source connecting lines 37 are formed as the connecting lines, and in addition to the drain electrodes 71d, the gate electrodes 71g and source electrodes 71s are formed as the first and second electrodes of the 2-terminal elements 71, respectively.

At this point, gap portions are patterned into the n+ layer in both the entire active matrix substrate and the section in the vicinity of the short-ring portion. More specifically, gap portions 3a of the switching elements 3 in the active matrix portion 31 and gap portions 71a of the 2-terminal elements 71 that altogether constitute the short-ring 38 are patterned.

In other words, in each switching element, the gap portion 3a forming a channel region is formed by etching the semiconductor layer 5 and contact layer 6 using the source electrode 3s and drain electrode 3d as the mask. On the other hand, in each 2-terminal element 71, the gap portion 71a forming a channel region is formed by etching the semiconductor layer 5 and contact layer 6 using the source electrode 71s and drain electrode 71d as the mask.

Subsequently, the pixel electrodes 2 are formed out of a third conductive film in the active matrix portion 31 (S26). To be more specific, a 1500 Å-thick ITO film is formed through the sputtering as the third conductive film, and out of which the pixel electrodes 2 are formed through the subsequent photolithography and etching. concurrently with S26, the ITO film is formed on the metal layer 41 which will be made into the scanning line input terminals 34 in the section in the vicinity of the short-ring portion, and an ITO film 42 is formed through the subsequent photolithography and etching (S26').

Then, the active matrix substrate using the channel-etch type TFTs both in the active matrix portion and short-ring is produced in the above manner.

As previously mentioned (with reference to the graph of FIG. 3), the resistance value of the short-ring 38 formed in the active matrix substrate must be set in such a manner that the current value across the input terminals varies smoothly with an applied voltage, so that a very small voltage can cause a current to flow across the terminals.

In the active matrix substrate produced in the above producing method, however, a satisfactory short-ring resistance may not be obtained because of a defect of the 2-terminal elements that altogether constitute the short-ring. For example, if the photolithography is incomplete in the producing procedure, the resulting 2-terminal element may short-circuit. In this case, the line (scanning electrode or signal electrode) connected to the short-circuited 2-terminal element is recognized as a line defect (defect caused by the leakage between the lines) on the active matrix substrate.

However, since the short-ring is provided to prevent the static electricity inputted sporadically from the external and can be omitted after the driver is mounted, the short-ring connected to the line recognized as the line defect can be cut to eliminate the leakage, whereby the line defect on the active matrix substrate is eliminated.

Figure 14:
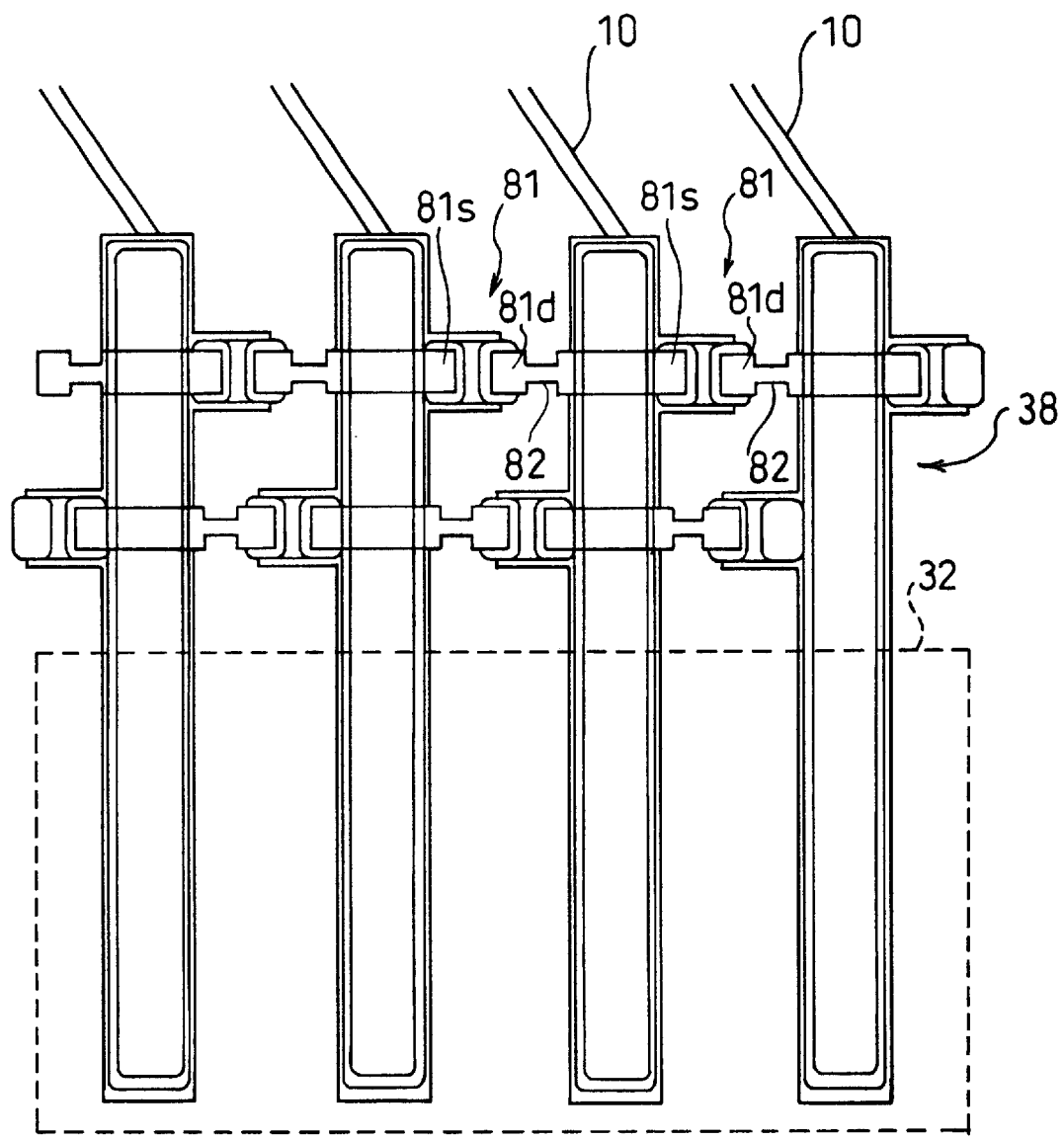
FIG. 14 is a schematic plan view showing a section in the vicinity of still another short-ring portion provided to the active matrix substrate.
Figure 15:
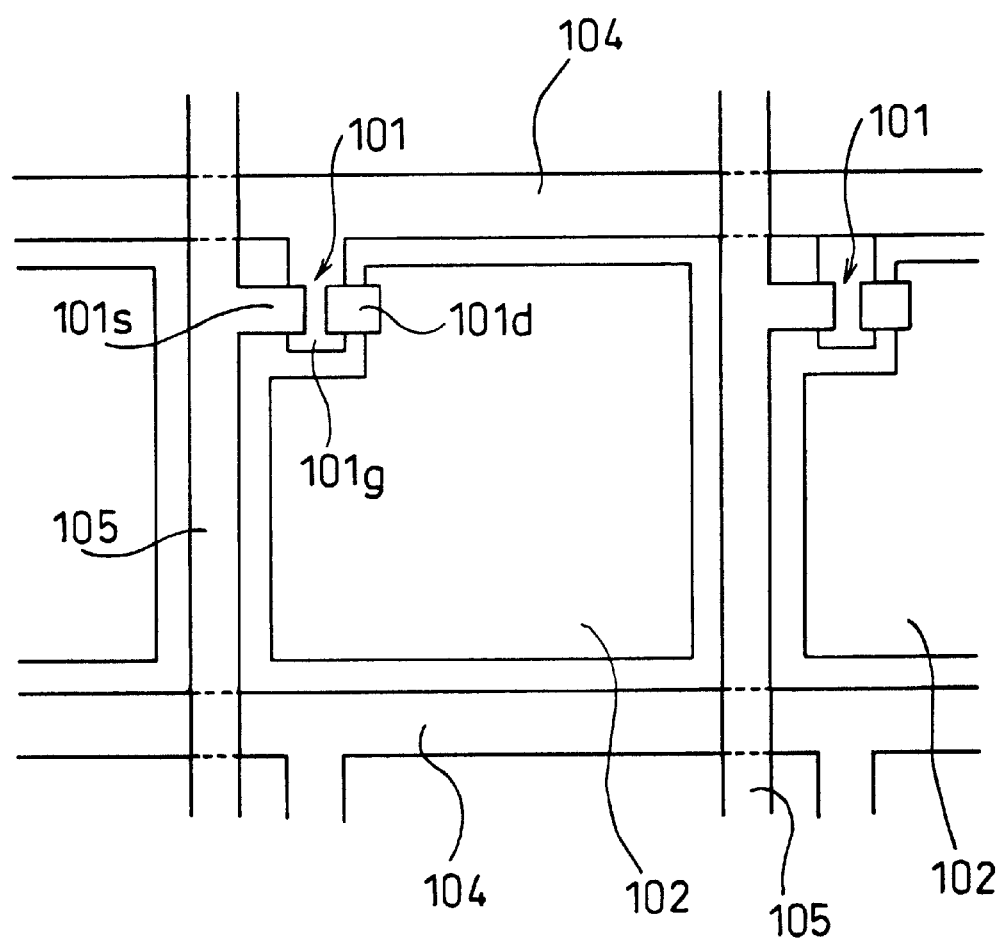
FIG. 15 is a schematic plan view showing a section in the vicinity of a conventional active matrix substrate.
Figure 16:
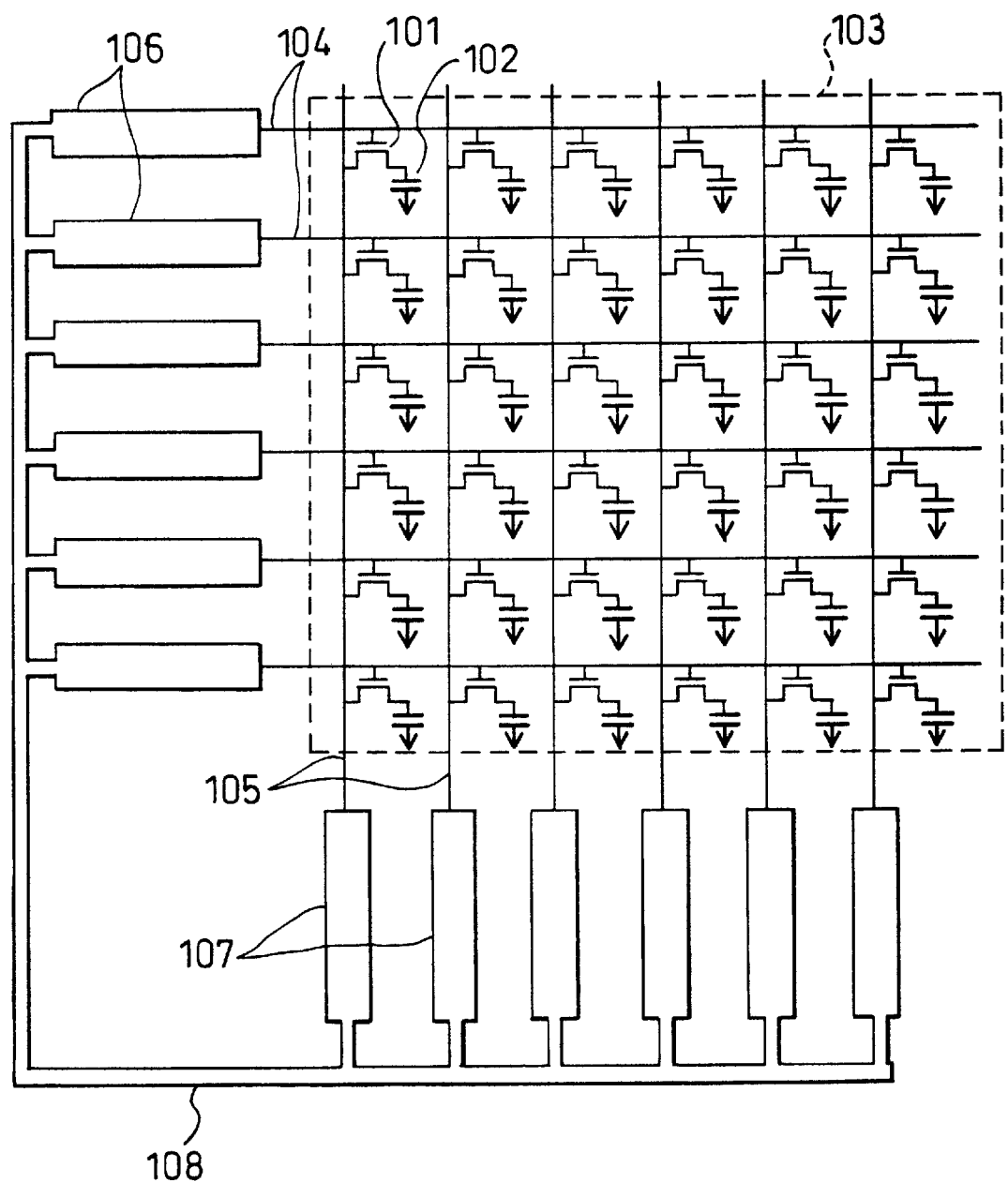
FIG. 16 is a schematic plan view showing a conventional active matrix substrate.
Figure 17:
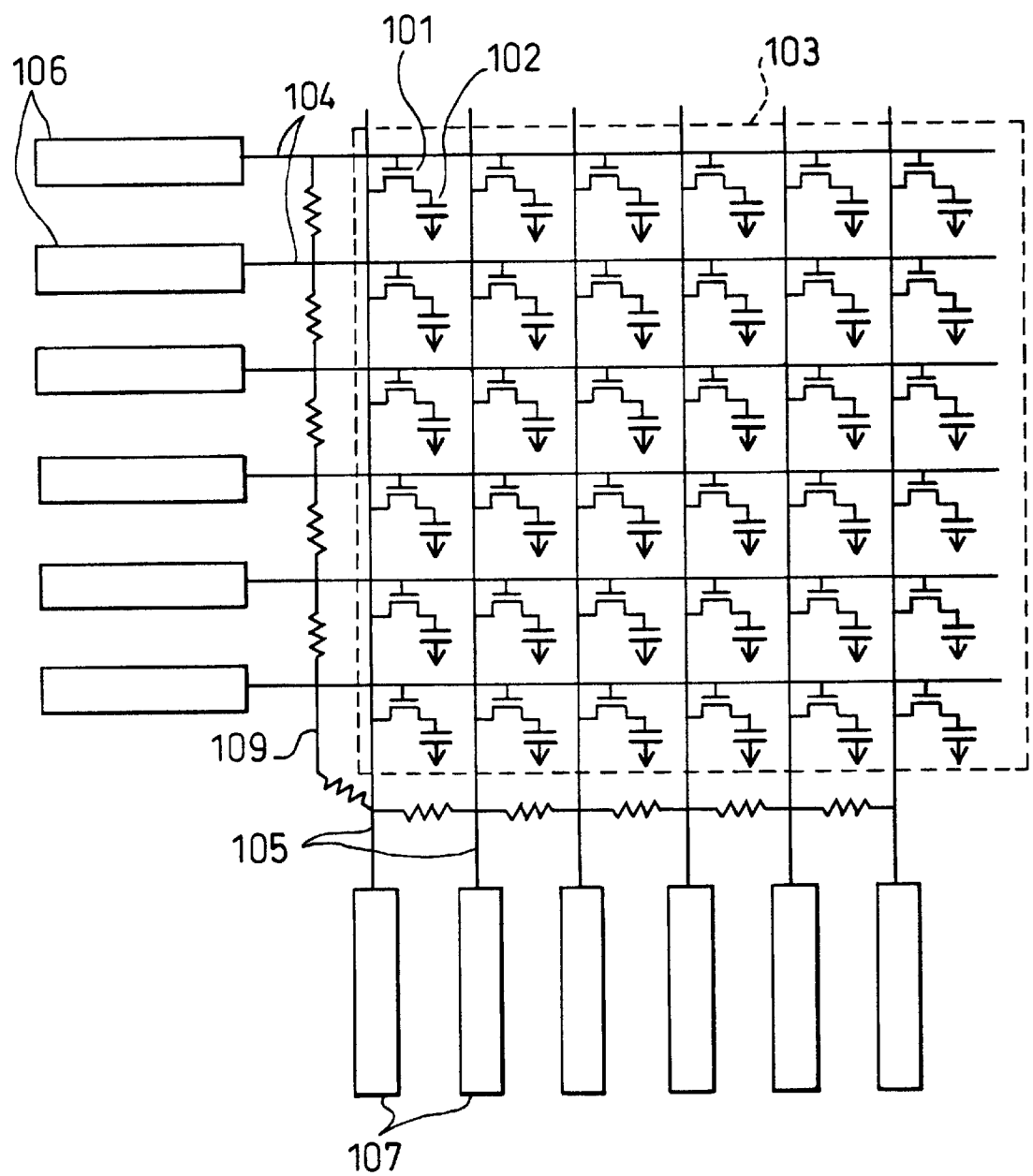
FIG. 17 is a schematic plan view showing another conventional active matrix substrate.

Therefore, as shown in FIG. 14 as an example, the connecting portion of a drain electrode 81d of one 2-terminal element 81 and a source electrode 81s of the adjacent 2-terminal element 81 is reduced in width to form a rectangular restriction portion 82 in the short-ring 38. According to this arrangement, the defect of the 2-terminal element 81, such as the short-circuit, can be readily eliminated with a laser cutter or the like in the steps after the driver is mounted.

In the present embodiment, the short-ring 38 is provided between the active matrix portion 31 and the scanning line and signal line input terminals 32 and 33. However, besides the above arrangement, the short-ring 38 may be formed at the edge portion of the bus lines, or inside the active matrix portion 31 other than the display area but if the numerical aperture does not have to be concerned much, the short-ring 38 can be formed in the display portion of the active matrix portion 31.

As has been explained, according to the above-explained active matrix substrate of the present embodiment, the resistance value between the input terminals can be stabilized by providing the short-ring comprising the 2-terminal elements each having a controllable resistance value to the input terminals. Consequently, it has become possible to increase a margin of the active matrix substrate for the static electricity, thereby improving the production yield of the liquid crystal display devices or the like using the above active matrix substrate of the present invention.

In the active matrix substrate of the present invention, the resistance of the short-ring is controlled using the ON resistance of the TFTs, namely, the 2-terminal elements that altogether constitute the short-ring. Thus, the resistance value of the short-ring can be stabilized in a more reliable manner.

In addition, the resistance value of the short-ring of the present invention drops as the applied potential rises, and therefore, the short-ring of the present invention has better charge dispersing ability compared with the short-ring made of a semiconductor using a simple serial resistance. Moreover, the short-ring of the present invention is composed of at least a pair of 2-terminal elements connected in parallel and having the conductive characteristics in the opposite directions.

Thus, the charges can be dispersed efficiently in response to even a very weak static electricity close to a point the where the electrical breakdown occurs. Consequently, the active matrix substrate of the present invention can attain the effect that the charges of the static electricity can be dispersed efficiently in response to a wide range of voltages.

Further, according to the producing method of the active matrix substrate of the present invention, since the 2-terminal elements that altogether constitute the short-ring are of the same structure as the TFTs serving as the switching elements in the active matrix portion. Thus, it has become possible to adopt the short-cut process, in which the channel-etch type TFTs are used as the switching elements of the active matrix substrate, and most characteristically, the gap portions are etched using the source and drain electrodes of the switching elements as the mask.

Therefore, if both the switching elements and 2-terminal elements are composed of the channel etch type TFTs, the short-ring can be formed without adding an additional producing step, such as the patterning step using the photoresist.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active matrix substrate comprising:

an insulating substrate;

a plurality of scanning lines and signal lines provided on said insulating substrate in a matrix pattern;

pixel electrodes, each of which being provided to areas enclosed by said scanning lines and signal lines, respectively;

switching elements electrically connected to said scanning lines, signal lines, and pixel electrodes, respectively; and a resistance control element electrically connecting at least two lines selected arbitrarily from each of said scanning lines and signal lines, said resistance control element varying a resistance value between the at least two lines in response to a voltage applied to the resistance control element, the resistance control element having two thin film transistors (TFTs), and an ON resistance of the TFTs controls the resistance value between the at least two lines, wherein said each of said two thin film transistors each have a source electrode of a first TFT electrically connected to and a drain electrode of the other TFT.

2. The active matrix substrate of claim 1, wherein said two thin film transistors are channel-etch type transistors.

3. An active matrix substrate comprising:

an insulating substrate;

a plurality of scanning lines and signal lines provided on said insulating substrate in a matrix pattern;

pixel electrodes, each of which being provided to areas enclosed by said scanning lines and signal lines, respectively;

switching elements electrically connected to said scanning lines, signal lines, and pixel electrodes, respectively; and a resistance control element electrically connecting at least two lines selected arbitrarily from each of said scanning lines and signal lines, said resistance control element varying a resistance value between the at least two lines in response to a voltage applied to the resistance control element, the resistance control element having two thin film transistors (TFTs), and an ON resistance of the TFTs controls the resistance value between the at least two lines, wherein said signal lines and pixel electrodes are made of a same conductive film.

4. An active matrix substrate comprising:

an insulating substrate;

a plurality of scanning lines and signal lines provided on said insulating substrate in a matrix pattern;

pixel electrodes arranged in an array in said matrix pattern;

switching elements electrically connected to said scanning lines, signal lines, and pixel electrodes; and a first set of two parallel thin film transistors (TFTs) electrically connecting at least one pair of said scanning lines or at least one pair of said signal lines, a second set of two parallel TFTs electrically connecting at least one of said scanning lines to at least one of said signal lines, and said first set of TFTs smoothly varying a resistance value between the at least one pair of said scanning lines or at least one pair of said signal lines in response to a voltage applied across the first set of TFTs wherein an ON resistance of the second set of TFTs controls the resistance value between the at least one pair of said scanning lines or at least one pair of said signal lines, said second set of TFTs smoothly varying a resistance value between the at least one of said scanning lines and at least one of said signal lines in response to a voltage applied across the second set of TFTs, wherein an ON resistance of the second set of TFTs controls the resistance value between the at least one of said scanning lines and at least one of said signal lines.

5. An active matrix substrate comprising:

an insulating substrate;

a plurality of scanning lines a n d signal lines provided on said insulating substrate in a matrix pattern;

pixel electrodes, each of which being provided to areas enclosed by said scanning lines and signal lines, respectively;

switching elements electrically connected to said scanning lines, signal lines, and pixel electrodes, respectively; and a resistance control element electrically connecting at least two lines of said scanning lines or at least two lines of said signal lines, said resistance control element varying a resistance value between the at least two lines in response to a voltage applied to the resistance control element, the resistance control element having two thin film transistors (TFTs) each connected to both of said at least two lines, and an ON resistance of the TFTs controls the resistance value between the at least two lines, wherein said TFTs include a first set of TFTs smoothly varying a resistance value between one pair of said scanning lines or one pair of said signal lines in response to a voltage applied across the first set of TFTs wherein an ON resistance of the second set of TFTs controls the resistance value between the one pair of said scanning lines or at least one pair of said signal line, and a second set of TFTs smoothly varying a resistance value between one of said scanning lines and one of said signal lines in response to a voltage applied across the second set of TFTs, wherein an ON resistance of the second set of TFTs controls the resistance value between the one of said scanning lines and one of said signal lines.

6. The active matrix substrate of claim 5, wherein said at least two lines connected through said resistance control element are selected from said scanning lines.

7. The active matrix substrate of claim 5, wherein said at least two lines connected through said resistance control element are selected from said signal lines.

8. A liquid crystal display device using the active matrix substrate of claim 5.

* * * * *